United States Patent [19]
Kinokami

[11] Patent Number: 6,007,444
[45] Date of Patent: Dec. 28, 1999

[54] HYDROMECHANICAL TRANSMISSION

[75] Inventor: Kenji Kinokami, Osaka, Japan

[73] Assignee: Daikin Industries, Ltd., Osaka, Japan

[21] Appl. No.: 09/147,020

[22] PCT Filed: Mar. 10, 1997

[86] PCT No.: PCT/JP97/00745

§ 371 Date: Sep. 11, 1998

§ 102(e) Date: Sep. 11, 1998

[87] PCT Pub. No.: WO97/34091

PCT Pub. Date: Sep. 18, 1997

[30]     Foreign Application Priority Data

Mar. 12, 1996  [JP]  Japan .................................. 8-054434

[51] Int. Cl.⁶ .................................................. F16H 47/04
[52] U.S. Cl. ................................ 475/81; 475/72; 475/76
[58] Field of Search ........................... 475/81, 72, 76, 475/78, 80, 82

[56]             References Cited

U.S. PATENT DOCUMENTS

| | | | |
|---|---|---|---|
| 3,979,972 | 9/1976 | Sakai et al. | 475/81 |
| 4,341,131 | 7/1982 | Pollman | 475/81 |
| 4,754,664 | 7/1988 | Dick | 475/81 |
| 5,080,637 | 1/1992 | Tenberge et al. | 475/81 |

FOREIGN PATENT DOCUMENTS

| | | |
|---|---|---|
| 54-35560 | 3/1979 | Japan . |
| 1-105066 | 4/1989 | Japan . |
| 1-178037 | 7/1989 | Japan . |
| 1-210658 | 8/1989 | Japan . |
| 3-503562 | 8/1991 | Japan . |
| 6-50410  | 2/1994 | Japan . |

*Primary Examiner*—Charles A. Marmor
*Assistant Examiner*—Ankur Parekh
*Attorney, Agent, or Firm*—Sixbey, Friedman, Leedom & Ferguson; Donald R. Studebaker

[57]             ABSTRACT

A mechanical transmission (3; MT) is interposed between an input shaft (1) and an output shaft (2), and a hydrostatic transmission (4; HST) is disposed in parallel with the MT (3). Between the input shaft (1) and the input side of the MT, a third planetary gear set (15) is interposed for reducing input shaft rpm to reduced rpm corresponding to a predetermined reduction gear ratio. A fourth selectively-engageable clutch (13) for applying rotation at the reduced rpm in low to intermediate change gear ratio ranges and a fifth selectively-engageable clutch (14) for applying rotation at the input shaft rpm in a high change gear ratio range are provided, so that the number of modes of operation is increased. A controller (18) controls the switch of each of selectively-engageable clutches (10–14) between engagement and disengagement and the swash plate angle of a variable swash plate (51) for keeping an output from the HST in a condition not transmitted to the MT, and seven lockup operation points are set between the low change gear ratio range and the high change gear ratio range. Thereby, the number of lockup operation points is increased so that the power transmission efficiency in the lockup operation is increased. The increase in the number of lockup operation points is realized without upsizing the HST while increasing the output of the entire HMT. Further, the increase in the number of lockup operation points is realized without upsizing a final reduction gearing of a vehicle to which the steplessly variable speed transmission is applied.

12 Claims, 22 Drawing Sheets

PRIOR ART

PRIOR ART

PRIOR ART

PRIOR ART

HYDROMECHANICAL TRANSMISSION

TECHNICAL FIELD

This invention relates to a steplessly variable speed transmission for use in buses, trucks, various types of constructive machines and various types of industrial machines, and particularly relates to a steplessly variable speed transmission called a hydromechanical transmission (hereinafter, referred to as an HMT). The HMT is formed such that a hydrostatic transmission (hereinafter, referred to as an HST) using static pressure energy of fluid is combined with a mechanical transmission (hereinafter, referred to as an MT) through a planetary gear set and the like, and performs a steplessly continuous speed change.

BACKGROUND ART

As a steplessly variable speed transmission of this type, there is conventionally known a technique proposed in U.S. Pat. No. 4,341,131 or Japanese Patent Application Laid-Open Gazette No. 54-35560. In this technique, as shown in FIG. 1, an HST (4'), in which a hydraulic pump (5) having a variable swash plate (51) is connected to a hydraulic motor (6) having a fixed swash plate (61'), is combined with an MT (3') including first and second planetary gear sets (7', 8'), first to third selectively-engageable clutches (10, 11, 12) for switching operational conditions of each of the planetary gear sets (7', 8') and so on. The proposed steplessly variable speed transmission performs speed control, under conditions that the relationship between the gear ratios of the two planetary gear sets (7', 8') is specifically set and the variable swash plate (51) is set to have a swash plate angle (maximum swash plate angle) identical with that of the fixed swash plate (61') at each time of mode switch in the case where the steplessly variable speed transmission is operated in divided three modes of operation.

As shown in FIG. 2, the HMT disclosed in the above-mentioned Gazette normally has a system designed such that the variable swash plate (51) of the hydraulic pump (5) is controlled so as to be changed between the three modes of operation according to the change gear ratio of the HMT and thereby rotation applied from a drive source such as an engine to an input shaft (1) of the HMT at constant rpm is transmitted to an output shaft (2) of the HMT at steplessly and continuously changed rpm. In this case, as shown by dash-double-dot line in FIG. 2, the variable swash plate (51) of the hydraulic pump (5) is controlled such that the swash plate angle is gradually increasingly or decreasingly changed at a constant rate of increase or decrease between each maximum swash plate angle (for example, 17 degrees and −17 degrees) position and a neutral position (a swash plate angle of zero) in each of the first, second and third modes or a total of three modes of operation in all. On the other hand, the swash plate of the hydraulic motor (6) is the fixed swash plate (61') and its swash plate angle is always set at the maximum swash plate angle as shown in dash-single-dot line in FIG. 2. When the variable swash plate (51) is inclined at the normal-side or reverse-side maximum swash plate angle or is in change gear ratio positions where the absolute value of the swash plate angle is equal to the swash plate angle of the fixed swash plate (61') (change gear ratio positions corresponding to respective rpm shown by I and III in FIG. 2), the switch from the first mode to the second mode and the switch from the second mode to the third mode are respectively carried out.

In the MT (3'), only the first clutch (10) is put into engagement in the first mode, only the second clutch (11) is put into engagement in the second mode, and only the third clutch (12) is put into engagement in the third mode. At each switch between modes of operation, the clutches (10, 11, 12) are each switched between engagement and disengagement. Further, at the switch of each of the clutches (10, 11, 12) between engagement and disengagement, it is necessary to fulfil a condition that the first and second planetary gear sets (7', 8') have the below-mentioned relationship between their gear ratios in order that each of the clutches (10, 11, 12) synchronizes at the same rpm and transmit rotation at a continuous change gear ratio between before and after the switch of the clutch. That is, the first and second planetary gear sets (7', 8') are conditioned that the following relationship

Y=X+1 is established where Y is a gear ratio between a sun gear (71') and a ring gear (73') of the first planetary gear set (7') and X is a gear ratio between a sun gear (81') and a ring gear (83') of the second planetary gear set (8') (See FIG. 3).

DISCLOSURE OF INVENTION

Problems that the Invention is to Solve

If a normal operation that power transmission is made through both the MT (3') and the HST (4') is continued also when a vehicle on which the conventional steplessly variable speed transmission is mounted keeps running at a constant speed, this is not preferable from the viewpoint of transmissivity. In such a case, it can be considered to cause the steplessly variable speed transmission to perform a lockup operation of blocking power transmission from the input shaft (1) to the output shaft (2) through the HST (4') and switching to power transmission through the MT (3') only.

In the above steplessly variable speed transmission, however, when the input rpm applied from the input shaft (1) to the MT (3') and the HST (4') is constant, the mode of operation cannot be selected only from among a mode of operation for switching an input from the MT (3') to two rotational shafts of the planetary gear sets (7', 8') and two modes of operation for locking either one of rotations of the two rotational shafts, or a total of three modes M1, M2 and M3. Accordingly, the steplessly variable speed transmission to be used is limited to one having three selectively-engageable clutches (10, 11, 12) for changing a transmission path of the input rpm.

Therefore, the change gear ratio positions changeable between the normal operation and the lockup operation are limited, in terms of the relationship with the control of the swash plate angle of the variable swash plate (51) in association with the switch between the modes of operation, to change gear ratio positions such as mode switch points at which the variable swash plate (51) of the hydraulic pump (5) is positioned at the maximum swash plate angle equal in absolute value to that of the fixed swash plate (61') of the hydraulic motor (6) to put the HST (4') into a freewheeling condition (positions shown by rpm I and III in FIG. 2) and change gear ratio positions in which the variable swash plate (51) is positioned at the neutral position of a swash plate angle of zero degree to put the HST (4') into no rotation (positions shown by rpm II and IV in FIG. 2), or a total of four positions. Even if a special mechanism of a bypass shaft (See 15 in FIG. 1) is additionally provided, it merely adds one change gear ratio position corresponding to rpm V in a maximum speed range (a position show by rpm V in FIG. 2)

and increases the number of lockup operation points to 5. Further, in the lockup operation of the steplessly variable speed transmission, the arrangement of the five change gear ratio positions as lockup operation points is limited to an arithmetic arrangement at uniform intervals such as 0.32, 0.66, 1.00, 1.32 and 1.64 shown as examples of change gear ratios corresponding to the rpm I, II, III, IV and V in FIG. 4. Hence, a geometric arrangement preferable as an arrangement of change gear ratio positions as lockup operation points, for example, an arrangement that the value of the change gear ratio at a higher lockup operation point becomes √2 times as large as the value of the change gear ratio at a lower lockup operation point, cannot be accomplished. In addition, such an arithmetic arrangement induces an extensive drop in efficiency between adjacent lockup operation points particularly in a low change gear ratio range, and causes a large variation in rpm of the engine thereby resulting in a driver feeling a sense of incongruity.

As shown in FIG. 3, which is a planetary speed diagram in the case where the relationship of the gear ratios of the first and second planetary gear sets (7', 8'; see FIG. 1) of the MT is set to Y=X+1, the rpm I–V are rpm obtained through operation control in the first mode M1 in which only the first clutch (10; see FIG. 1) is put into engagement, in the second mode M2 in which only the second clutch (11; see FIG. 1) is put into engagement and in the third mode M3 in which only the third clutch (12; see FIG. 1) is put into engagement.

In the third mode M3, in order to obtain necessary large rpm of the output shaft (2), a setting of the gear ratio of connecting gears (66', 76') for connecting the motor shaft (62) as an output side of the HST (4') to a connecting shaft (75) of the MT (3') is restricted by the maximum allowable rpm of the HST (4'). Therefore, the maximum output torque of the output shaft (2) is restricted by limitation of torque transmitted from the HST (4'), which imposes a limit in increasing performance of the maximum output torque of the HMT. On the other hand, if the capacity of the HST (4') is increased in order to improve torque performance of the HMT, this upsizes the HST (4') and further upsizes the entire HMT, increases its weight and increases the manufacturing cost.

In view of the above circumstances, the present invention has been made and has an object of increasing a gear change efficiency in a lockup operation by accomplishing increase in number of lockup operation points. Further, the present invention has an object of accomplishing the increase in number of lockup operation points without upsizing the HST while increasing the output of the entire HMT. In addition, the present invention has an object of accomplishing the increase in number of lockup operation points without upsizing a final reduction gearing of a vehicle to which a steplessly variable speed transmission is applied.

SUMMARY OF THE INVENTION

The present invention premises a steplessly variable speed transmission comprising: an input shaft (1) connected to a drive source; an output shaft (2); a mechanical transmission (3) interposed between the input shaft (1) and the output shaft (2); and a hydrostatic transmission (4) which is disposed in parallel with the input shaft (1) and the output shaft (2), is connected at an input side thereof to the input shaft (1) and is connected at an output side thereof to the output shaft (2) through the mechanical transmission (3), wherein the mechanical transmission (3) and the hydrostatic transmission (4) are operated in accordance with a change gear ratio so that rotation applied to the input shaft (1) at constant rpm is transmitted to the output shaft (2) at steplessly changed rpm.

The premised hydrostatic transmission (4) is provided with: an input-side hydraulic pump (5) for converting rotation applied from the input shaft (1) to a pump shaft (52) into a specified amount of discharge liquid by controlling increase or decrease of the swash plate angle of a variable swash plate (51) between a neutral position at a swash plate angle of zero degree and an inclined position at a specified swash plate angle in each of plural modes of operation; and an output-side hydraulic motor (6) for converting a pressure of the discharge liquid from the hydraulic pump (5) into a rotational force by a swash plate (61) set at a specified swash plate angle to rotate a motor shaft (62). Further, the mechanical transmission (3) is provided with the below-mentioned first and second planetary gear sets (7, 8) and first to third selectively-engageable clutches (10, 11, 12). Specifically, the first planetary gear set (7) includes a first sun gear (71) operatively connected to the motor shaft (62) of the hydrostatic transmission (4), a first planet gear (72) engaged with the first sun gear (71) for revolution therearound, and a first ring gear (73) engaged with the first planet gear (72) and operatively connected to the output shaft (2). The second planetary gear set (8) includes a second sun gear (81) operable independently of the first sun gear (71), a second planet gear (82) whose carrier (84) is connected to the first ring gear (73) and which is engaged with the second sun gear (81) for revolution therearound in synchronism with the first ring gear (73), and a second ring gear (83) engaged with the second planetary gear (82) and connected to a carrier (74) of the first planet gear (72) for rotation in synchronism with the first planet gear (72). The first clutch (10) is for disengageably engaging both the first planet gear (72) and the second ring gear (83) with a non-rotation part (103) in accordance with each mode of operation. The second clutch (11) is for disengageably engaging the second sun gear (81) with the input shaft (1) in accordance with each mode of operation. The third clutch (12) is for disengageably engaging both the first planet gear (72) and the second ring gear (83) with the input shaft (1) in accordance with each mode of operation.

In the above premise, the steplessly variable speed transmission of the present invention further comprises an input rpm reduction mechanism (15), a switching mechanism (13, 14) and lockup operation control means (18). Specifically, the input rpm reduction mechanism (15) is interposed between the input shaft (1) and the input side of the mechanical transmission (3) to apply rotation of the input shaft (1) to the input side of the mechanical transmission (3) at reduced rpm corresponding to a predetermined reduction gear ratio. The switching mechanism (13, 14) is provided on the input rpm reduction mechanism (15) to control the operation switch of the input rpm reduction mechanism (15) between an operating position of applying rotation of the input shaft (1) to the input side of the mechanical transmission (3) at the reduced rpm in the mode of operation from a low change gear ratio range to an intermediate change gear ratio range and a non-operating position of applying rotation of the input shaft (1) to the input side of the mechanical transmission (3) at a non-reduced speed in the mode of operation in a high change gear ratio range. Further, the lockup operation control means (18) is for controlling, when the rpm of the output shaft (2) is specified rpm, the hydrostatic transmission (4) to put the motor shaft (62) into a freewheeling condition thereby changing into a condition that power is not transmitted from the hydrostatic transmission (4) to the output shaft (2).

In the present invention, when the change gear ratio of the steplessly variable speed transmission is in the mode of operation from the low change gear ratio range to the intermediate change gear ratio range, the input rpm reduction mechanism (15) is put into operation by the switching mechanism (13, 14). On the other hand, when the change gear ratio is in the mode of operation in the high change gear ratio range, the input rpm reduction mechanism (15) is put into no operation by the switching mechanism (13, 14). Thereby, the input rpm to the input side of the mechanical transmission (3) can be changed in two types according to the mode of operation, for example, in such a manner that rotation is applied at the reduced rpm in the mode of operation from the low change gear ratio range to the intermediate change gear ratio range while rotation is applied at the rpm identical with that of the input shaft (1) in the mode of operation in the high change gear ratio range. Thus, since the steplessly variable speed transmission is operated in a manner that the mode of operation from the low change gear ratio range to the intermediate change gear ratio range in which rotation is applied at the reduced constant rpm is divided into the conventional first to third modes, the mode of operation in the high change gear ratio range in which rotation is applied at the rpm identical with that of the input shaft (1) is added to the conventional modes of operation. This allows the mode of operation to be increased from the conventional three modes to more than four modes. Accordingly, the number of lockup operation points can be increased as compared with the prior art by putting the hydrostatic transmission (4) into a freewheeling condition at a change gear ratio allowing a lockup operation by the lockup operation control means (18) also in the added mode. Further, since the mode of operation from the low change gear ratio range to the high change gear ratio range can be divided into modes in number larger than the conventional three modes, the arrangement of lockup operation points capable of the lockup operation in each mode of operation becomes denser so that a drop in efficiency between the lockup operation points can be restricted thereby increasing the gear change efficiency. In addition, such an increase in lockup operation points can be accomplished without addition of any special elements such as a bypass shaft, which avoids the entire transmission from being upsized due to the additional elements.

In the present invention, each of the above-mentioned structural elements can be specified and other structural elements can be additionally provided, as shown in the following cases.

In the first case, the input rpm reduction mechanism can be formed of, for example, a third planetary gear set (15) including: a third sun gear (151) operatively connected to the input shaft (1); a third planet gear (152) engaged with the third sun gear (151) for revolution therearound; and a third ring gear (153) engaged with the third planet gear (152) and non-rotatably fixed. In addition, the switching mechanism can consist of, for example, a fourth selectively-engageable clutch (13) for disengageably connecting the third planet gear (152) to the second clutch (11) and the third clutch (12) therethrough and a fifth selectively-engageable clutch (14) for disengageably connecting the third sun gear (151) to the second sun gear (81) therethrough.

In the above first case, the structure of the input rpm reduction mechanism of the present invention is specified by the third planetary gear set (15), and the structure of the switching mechanism is specified by the pair of fourth and fifth clutches (13, 14). This provides the operations of the input rpm reduction mechanism and the switching mechanism with reliability. More specifically, by switching the fourth clutch (13) into engagement and switching the fifth clutch (14) into disengagement, rotation of the third planet gear (152) operated into rotation between the third sun gear (151) moving with the input shaft (1) and the third ring gear (153) secured in no rotation, is transmitted to the input ends of the second and third clutches (11, 12) as the input side of the mechanical transmission (3). Thereby, the rotation of the input shaft (1) is applied to the input ends of the second and third clutches (11, 12) at rpm reduced by the third planetary gear set (15). On the contrary, by switching the fourth clutch (13) into disengagement and switching the fifth clutch (14) into engagement, the input ends of the second and third clutches (11, 12) are put into a condition not power-transmitted, while rotation of the input shaft (1) is directly transmitted to the second sun gear (81) as the input side of the mechanical transmission (3) through the third sun gear (151). Thereby, rotation is applied to the second sun gear (81) at the rpm identical with that of the input shaft (1).

In the second case, the first case is further specified. That is, the mechanical transmission (3) can be arranged to have four modes of operation according to the change gear ratio composed of a first mode of operation for putting only both the first clutch (10) and the fourth clutch (13) into engagement during a period from a start to the low change gear ratio range, a second mode of operation for putting only both the second clutch (11) and the fourth clutch (13) into engagement in a lower intermediate change gear ratio range, a third mode of operation for putting only both the third clutch (12) and the fourth clutch (13) into engagement in a higher intermediate change gear ratio range, and a fourth mode of operation for putting only the fifth clutch (14) into engagement in the high change gear ratio range. In this second case, the structure of switch control of each of the first to fifth clutches (10–14) for operating the mechanical transmission (3) in the divided four modes from first to fourth is specified. This surely provides increase in number of modes of operation and hence increase in number of lockup operation points.

In the third case, increase/decrease control means (18) for controlling increase and decrease of the swash plate angle of the variable swash plate (51) of the hydraulic pump (5) can be provided in addition to the structure of the second case. The increase/decrease control means (18) is arranged to change the swash plate angle of the variable swash plate (51) at rates of increase and decrease that the variable swash plate (51) is in the neutral position at the start time in the first mode, is positioned at a specified reverse-side maximum swash plate angle at a first change gear ratio in switching the mode of operation from the first mode to the second mode, returns to the neutral position at an approximately middle change gear ratio in the change gear ratio range of the second mode, is in a normal-side maximum swash plate angle at a second change gear ratio in switching the mode of operation from the second mode to the third mode, returns to the neutral position at an approximately middle change gear ratio in the change gear ratio range of the third mode, is positioned at the reverse-side maximum swash plate angle at a third change gear ratio in switching the mode of operation from the third mode to the fourth mode, returns to the neutral position at an approximately middle change gear ratio in the change gear ratio range of the fourth mode and is positioned at the normal-side maximum swash plate angle at a highest change gear ratio in the change gear ratio range of the fourth mode. Further, the lockup operation control means (18) can be arranged to operate a freewheeling operation mechanism at the time of respective specified rpm which are rpm of the output shaft (2) corresponding to the first to third change gear ratios, the middle change gear ratios and the highest change gear ratio of the fourth mode.

In the above third case, there are specified the control of change of the swash plate angle of the variable swash plate (51) of the hydraulic pump (5) by the increase/decrease change control means (18) in each of the first to fourth modes and the lockup operation by the lockup operation control means (18) in each of the first to fourth modes according to the change of the swash plate angle of the variable swash plate (51) through the control of change of the swash plate angle. Thereby, as positions capable of the lockup operation, seven lockup operation points can be obtained by summing four points including the first, second and third change gear ratio positions and the highest change gear ratio position and three points including the middle change gear ratio positions. Increase in number of the lockup operation points can be surely accomplished as compared with the conventional four or five lockup operation points.

In the fourth case, the third case can be further specified. In detail, the lockup operation control means (18) can be arranged to keep the variable swash plate (51) of the hydraulic pump (5) in a position located at a maximum swash plate angle identical with that of the swash plate (61) of the hydraulic motor (6) at the first to third change gear ratios and the highest change gear ratio of the fourth mode while keeping the variable swash plate (51) in the neutral position of a swash plate angle of zero degree at the middle change gear ratios.

In the above fourth case, when the variable speed transmission is changed to the lockup operation by the lockup operation control means (18), at the first to third change gear ratios and the highest change gear ratio of the fourth mode, both the variable swash plate (51) of the hydraulic pump (5) and the swash plate (61) of the hydraulic motor (6) are kept at the same swash plate angle. In this condition, the rpm passing through the hydrostatic transmission (4) is fully synchronized with the rpm passing through the mechanical transmission (3) so that the mechanical transmission (3) transmits whole power to be applied to the steplessly variable speed transmission and the hydrostatic transmission (4) falls into a freewheeling condition without transmitting any power. When both the swash plate angles of the variable swash plate (51) and the swash plate (61) are positioned at the neutral position, both pistons (54, 64) of the hydraulic pump (5) and the hydraulic motor (6) do not slide in a reciprocating direction. This reduces non-load loss thereby further increasing efficiency and increasing the allowable rpm of the hydrostatic transmission (4). The input shaft (1) and the output shaft (2) are surely connected through the mechanical transmission (3) only, so that the steplessly variable speed transmission enters the lockup operation. On the other hand, at the middle change gear ratios in the second to the fourth modes, the variable swash plate (51) of the hydraulic pump (5) is kept in the neutral position. In this condition, since the variable swash plate (51) is kept in the neutral position even when rotation is applied from the input shaft (1) to the pump shaft (52), liquid is not discharged to the hydraulic motor (6) so that the motor shaft (62) falls into a locked condition, i.e., a non-rotatable condition, which prevents power transmission by the hydrostatic transmission (4). Thereby, like the above, the input shaft (1) and the output shaft (2) are surely connected through the mechanical transmission (3) only, so that the steplessly variable speed transmission enters the lockup operation.

In the fifth case, the third case can be further specified. In detail, the lockup operation control means (18) can be arranged to put the first, second and fourth clutches (10, 11, 13) into engagement at the rpm corresponding to the first change gear ratio, put the second, third and fourth clutches (11, 12, 13) into engagement at the rpm corresponding to the second change gear ratio, put the third, fourth and fifth clutches (12, 13, 14) into engagement at the rpm corresponding to the third change gear ratio and put the second, third and fifth clutches (11, 12, 14) into engagement at the rpm corresponding to the highest value in the change gear ratio range of the fourth mode.

In the above fifth case, the lockup operation at the rpm corresponding to the first change gear ratio in switching the mode of operation from the first mode to the second mode is performed with the first, second and fourth clutches put into engagement. In this case, the first planet gear (72) and the second ring gear (83) are put into a non-rotatable condition, and in this condition, the second sun gear (81) receives rotation at the reduced rpm through the fourth clutch (13) in engagement to rotate. As a result, the output shaft (2) is rotated through the second planet gear (82). Further, the lockup operation at the rpm corresponding to the second change gear ratio in switching the mode of operation from the second mode to the third mode is performed with the second, third and fourth clutches (11, 12, 13) put into engagement. In this case, the first planet gear (72), the second ring gear (83) and the second sun gear (81) receive rotation at the reduced rpm through the fourth clutch (13) in engagement to rotate. As a result, the output shaft (2) is rotated through the second planet gear (82) and the first ring gear (73). Furthermore, the lockup operation at the rpm corresponding to the third change gear ratio in switching the mode of operation from the third mode to the fourth mode is performed with the third, fourth and fifth clutches (12, 13, 14) put into engagement. In this case, the second ring gear (83) receives rotation at the reduced rpm through the fourth clutch (13) in engagement to rotate, while the second sun gear (81) receives rotation at the rpm identical with that of the input shaft (1) through the fifth clutch in engagement to rotate. As a result, the output shaft (2) is rotated through the second planet gear (82). In addition, the lockup operation at the rpm corresponding to the highest change gear ratio of the fourth mode is performed with the second, third and fifth clutches (11, 12, 14) put into engagement. In this case, the second sun gear (81) receives rotation at the rpm identical with that of the input shaft (1) through the fifth clutch (14) in engagement to rotate, while the second ring gear (82) receives rotation at the rpm identical with that of the input shaft (1) through the fifth, second and third clutches (14, 11, 12) in this order to rotate. As a result, the output shaft (2) is rotated through the second planet gear (82).

In the sixth case, under the structure of the fifth case, the motor shaft (62) as an output side of the hydraulic motor (6) is locked when the variable swash plate (51) is in the neutral position. For this purpose, a rotation locking mechanism (17) can be provided for locking rotation in a manner to receive torque generated on the motor shaft (62) instead of the motor shaft (62).

In the above sixth case, since the variable swash plate (51) of the hydraulic pump (5) is in the neutral position, the motor shaft (62) does not rotate but receives torque from the mechanical transmission (3). When the stepless variable speed transmission is changed to the lockup operation, the rotation locking mechanism (17) locks the motor shaft (62) of the hydraulic pump (6) in a manner to hold it to, for example, a casing (19) against rotation. Thereby, torque borne by the hydrostatic transmission (4) is borne by the rotation locking mechanism (21) instead. As a result, a liquid pressure which the hydrostatic transmission (4) generates for bearing torque can be removed.

In the seventh case, the third planetary gear set (15) in the third case can be specified as follows. In detail, the number of tooth of the third planetary gear set (15) can be set such that the reduction gear ratio of the third planet gear (152) to the third sun gear (151) takes a value represented in the following formula $$Y/(2X+Y+2) \qquad [1]$$

wherein Y is a gear ratio between the first sun gear (71) and the first ring gear (73) and X is a gear ratio between the second sun gear (81) and the second ring gear (83).

In the above seventh case, as for the reduction gear ratio through the third planetary gear set (15) as an input rpm reduction mechanism, its preferable index is specified. That is to say, the reduction gear ratio through the third planetary gear set (15) is specified based on the relationship with the gear ratios X, Y of the first and second planetary gear sets (7, 8) forming the mechanical transmission (3). Thus, in seven lockup operation points including the first, second and third change gear ratio positions, the highest change gear ratio position in the fourth mode and the three middle change gear ratio positions, synchronization of each of the clutches (10–14) disengageably engaged for lockup operation is accomplished. Also in the case where the input rpm reduction mechanism is formed using means other than the planetary gear set, the value of the above formula [1] can be adopted as a reduction gear ratio.

In the eighth case, in addition to the structure of the seventh case, a swash plate angle changing means (16) can be provided for changing the swash plate angle of the swash plate (61) of the hydraulic motor (6). The swash plate angle changing means (16) can be arranged to keep the swash plate (61) at the maximum swash plate angle in each of the first, second and third modes while changing the swash plate (61) to a smaller swash plate angle close to the neutral position in accordance with the reduction gear ratio of the third planetary gear set (15) on a higher change gear ratio side than the neutral position of the hydraulic pump (5) in the fourth mode.

In the above eighth case, when switch is made from the first, second or third mode, where the input rpm to the mechanical transmission (3) is reduced to the reduced rpm based on the specified reduction gear ratio, to the fourth mode where the input rpm is not reduced but rotation is applied to the mechanical transmission (3) at the rpm identical with that of the input shaft (1), the rpm applied to the mechanical transmission (3) is increased. At this time, unless the swash plate angle of the swash plate (61) of the hydraulic motor (6) of the hydrostatic transmission (4) is changed, the rpm of the output shaft (2) does not reach rpm capable of being locked up even when the swash plate (5') of the hydraulic pump (5) is inclined to the normal-side maximum swash plate angle. In contrast to the above, since the swash plate angle changing means (16) changes the swash plate of the hydraulic motor (6) to a smaller swash plate angle by a value corresponding to the reduction gear ratio in the neutral position of the swash plate of the hydraulic pump (5), output rpm of the motor shaft (62) outputted from the hydrostatic transmission (4) to the mechanical transmission (3) is increased corresponding to the increase in the input rpm to the mechanical transmission (3). Thus, the output shaft (2) can obtain the rpm capable of the lockup operation in the highest change gear ratio range of the fourth mode. Further, since the increase in the rpm of the motor shaft (62) in the fourth mode is accomplished by changing the swash plate (61) of the hydraulic motor (6) to a smaller swash plate angle, an oil amount necessary for the rotation of the motor shaft (62) becomes small. Thereby, the hydraulic pump (5) can be downsized extensively. In addition, the velocity of reciprocation of the piston (64) of the hydraulic pump (6) can be decreased so that the allowable rpm of the motor shaft (62) is increased, which allows the reduction gear ratio of the transmission gears (66, 76) to increase. This increases output torque.

In the ninth case, as the reduction gear ratio in the eighth case, a value of approximately ⅓ can be set.

In the above ninth case, a practically preferable value is specified as the reduction gear ratio in the third planetary gear set (15). Specifically, as for generally required values of the gear ratios Y, X of the first and second planetary gear sets (7, 8) in the mechanical transmission (3) forming a part of the steplessly variable speed transmission, the gear ratio X is approximately 2 and the gear ratio Y is approximately 3 obtained by adding 1 to the gear ratio X. Accordingly, when the gear ratios X, Y are substituted into the formula [1], approximately ⅓ is obtained as the value of the reduction gear ratio. In the first to third modes, rotation is applied to the mechanical transmission (3) at the reduced rpm equal to approximately ⅓ of the rpm of the input shaft (1). In the fourth mode, with the increase of the input rpm to the mechanical transmission (3) by three times the reduced rpm in the first to third modes, the output rpm of the motor shaft (62) as the output side of the hydrostatic transmission (4) is increased by three times through the change of the swash plate angle.

In the tenth case, in the aspect of the eighth case, the number of teeth of gears (66, 76) for connecting the motor shaft (62) of the hydraulic motor (6) with the first sun gear (71) can be set based on the relationship between the rpm of the output shaft (2) through the fifth clutch (14) in the fourth mode and the maximum allowable rpm of the motor shaft (62) corresponding to the swash plate angle changed by the swash plate angle changing means (16) in the fourth mode.

In the above tenth case, since the input rpm is reduced by the third planetary gear set (15) in the modes lower in change gear ratio than the fourth mode, the hydraulic pump (5) and the hydraulic motor (6) are each operated at rpm extensively smaller than the allowable rpm. Further, the reduction gear ratio of the gears (66, 76) is determined so as to restrict the rpm of the hydraulic motor (6) during the operation through the fifth clutch (14) on the high change gear ratio side in the fourth mode within the allowable rpm. At the time, the swash plate angle of the swash plate (61) of the hydraulic motor (6) is changed so as to come close to the neutral position, and therefore, the distance of sliding movement of the piston in the hydraulic motor (6) is proportional to a tangent value of inclination of the swash plate (61), which increases the allowable rpm as compared with the case of the normal swash plate angle. Accordingly, the reduction gear ratio of the gears (66, 76) is increased by the increase in the allowable rpm of the hydraulic motor (6). As a result, larger torque can be obtained in the first mode or in the first and second modes, where large torque is necessary.

In the eleventh case, in the aspect of the tenth case, the gear ratios of the gears (66, 76) and the swash plate angle of the swash plate (61) of the hydraulic motor (6) can be set in a condition that the rpm of the output shaft (2) does not exceed the rpm of the input shaft (1). In this eleventh case, since the rpm of the output shaft (2) does not exceed that of the input shaft (1) even at the highest change gear ratio in the fourth mode, vehicles applying a steplessly variable speed transmission can adopt a standard final reduction gearing for receiving power outputted from the output shaft (2). This increases the number of lockup operation points without upsizing the final reduction gearing.

EFFECTS OF THE INVENTION

According the steplessly variable speed transmission of the present invention, the number of modes of operation can be increased from conventional three modes to four or more modes by the input rpm reduction mechanism (15) and the switching mechanism (13, 14) for controlling the operation of the input rpm reduction mechanism (15). Accordingly, also in the additional mode of operation, the number of lockup operation points can be increased by carrying out the switch to the lockup operation at a change gear ratio capable of the lockup operation through the lockup operation control means (18). Further, the arrangement of the lockup operation points capable of the lockup operation can become denser in each mode of operation, which restricts a drop in efficiency between the lockup operation points thereby increasing the gear change efficiency. Furthermore, the increase in number of lockup operation points can be accomplished without adding any special elements such as a bypass shaft, which prevents the transmission from being upsized due to the additional element.

According to the first case, the structures of the input rpm reduction mechanism and the switching mechanism can be specified by the third planetary gear set (15) and the pair of fourth and fifth clutches (13, 14), respectively, thereby securely obtaining the effects of the input rpm reduction mechanism and the switching mechanism.

According to the second case, the structure of switch control of each of the first to fifth clutches (10–14) for operating the mechanical transmission (3) in the divided four modes from first to fourth can be specified, which securely accomplishes increase in number of modes of operation and increase in number of lockup operation points with the increase in number of modes of operation.

According to the third case, there can be specified the control of change of the swash plate angle of the variable swash plate (51) of the hydraulic pump (5) by the increase/decrease control means (18) in each of the first to fourth modes and the lockup operation by the lockup operation control means (18) in each of the first to fourth modes according to the changed swash plate angle of the variable swash plate (51) through the control of change of the swash plate angle. Thereby, as positions capable of the lockup operation, seven lockup operation points can be obtained by summing four points including the first, second and third change gear ratio positions and the highest change gear ratio position and three points including the middle change gear ratio positions. As compared with the conventional case where four or five positions capable of the lockup operation can be obtained, increase in number of lockup operation points can be concretely realized.

According to the fourth case, transmission of rotation from the hydrostatic transmission (4) to the mechanical transmission (3) can be securely changed into freewheeling or no transmission. As a result, the input shaft (1) and the output shaft (2) can be put into a lockup operation in which they are engaged through the mechanical transmission (3) only.

According to the fifth case, the lockup operation can be securely performed at the rpm corresponding to the change gear ratio at each mode of operation switch from the first to fourth modes.

According to the sixth case, a liquid pressure, which the hydrostatic transmission (4) generates for bearing torque during the lockup operation at the middle change gear ratio in each of the first to fourth modes, can be surely removed, thereby decreasing power loss of the hydrostatic transmission (4) during the lockup operation.

According to the seventh case, a preferable index of the reduction gear ratio by the third planetary gear set as an input rpm reduction mechanism can be specified, thereby surely obtaining synchronization of each clutch at the time of switch to the lockup operation.

According to the eighth case, at the switch from the third mode to the fourth mode in which the input rpm to the mechanical transmission (3) is switched from the reduced rpm to rpm identical with that of the input shaft (1), the output rpm of the output shaft (2) can be smoothly changed. Further, the hydrostatic transmission (4) can be extensively downsized, and the increase in allowable rpm of the motor shaft (62) can increase output torque.

According to the ninth case, a practically preferable value can be specified as a reduction gear ratio in the input rpm reduction mechanism.

According to the tenth case, output torque can be increased without upsizing the hydrostatic transmission (4) and the number of lockup operation points in the fourth mode can be increased.

According to the eleventh case, since the rpm of the output shaft (2) does not exceed the rpm of the input shaft (1) even at the highest change gear ratio in the fourth mode, a standard final reduction gearing for receiving power outputted from the output shaft (2) can be adopted in vehicles applying a steplessly variable speed transmission. This increases the number of lockup operation points without upsizing the final reduction gearing.

BEST MODE FOR CARRYING OUT THE INVENTION

Description will be made below about embodiments of the present invention with reference to the drawings.

Figure 1:
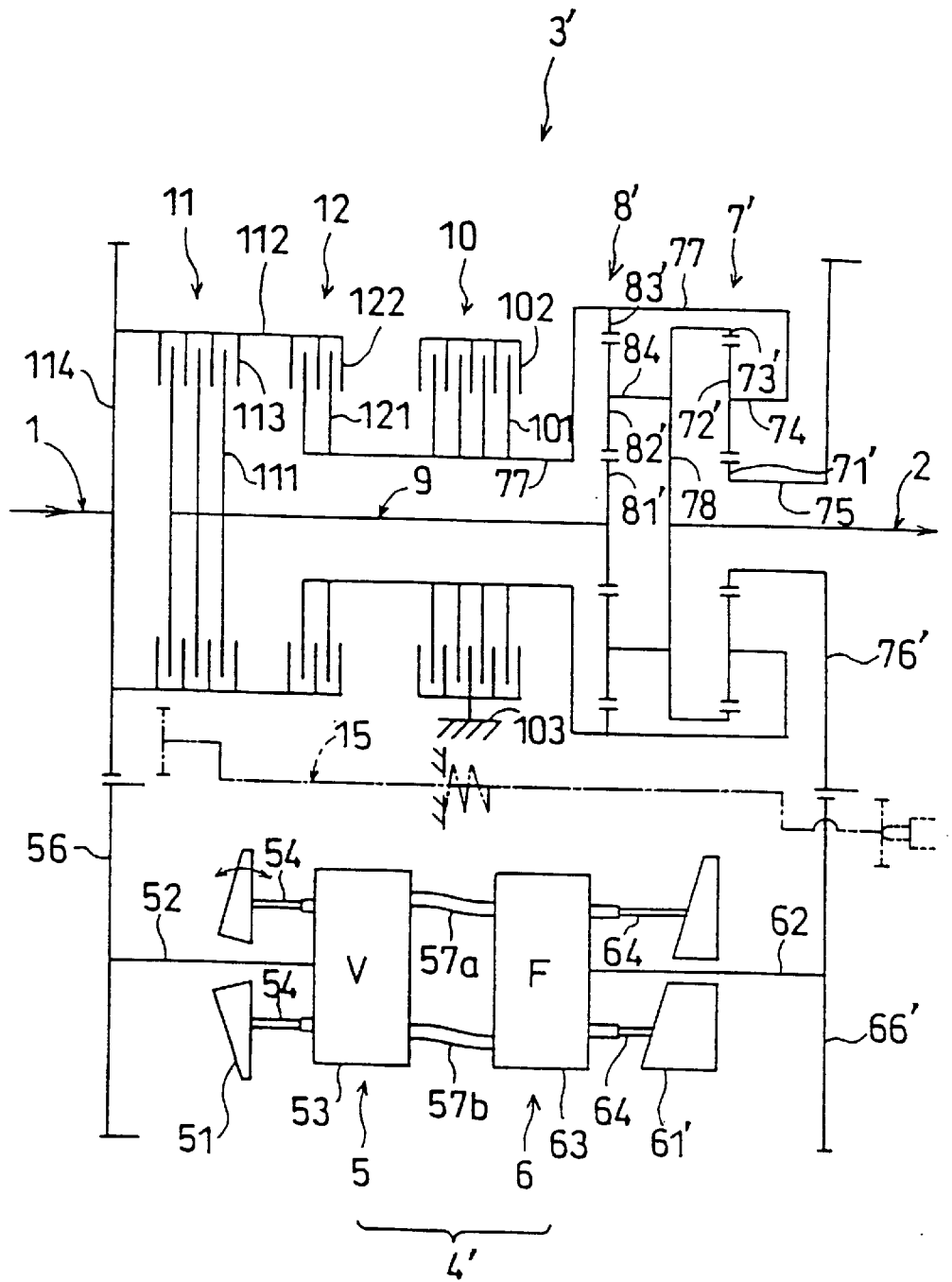
FIG. 1 is a schematic diagram showing a conventional steplessly variable speed transmission.
Figure 2:
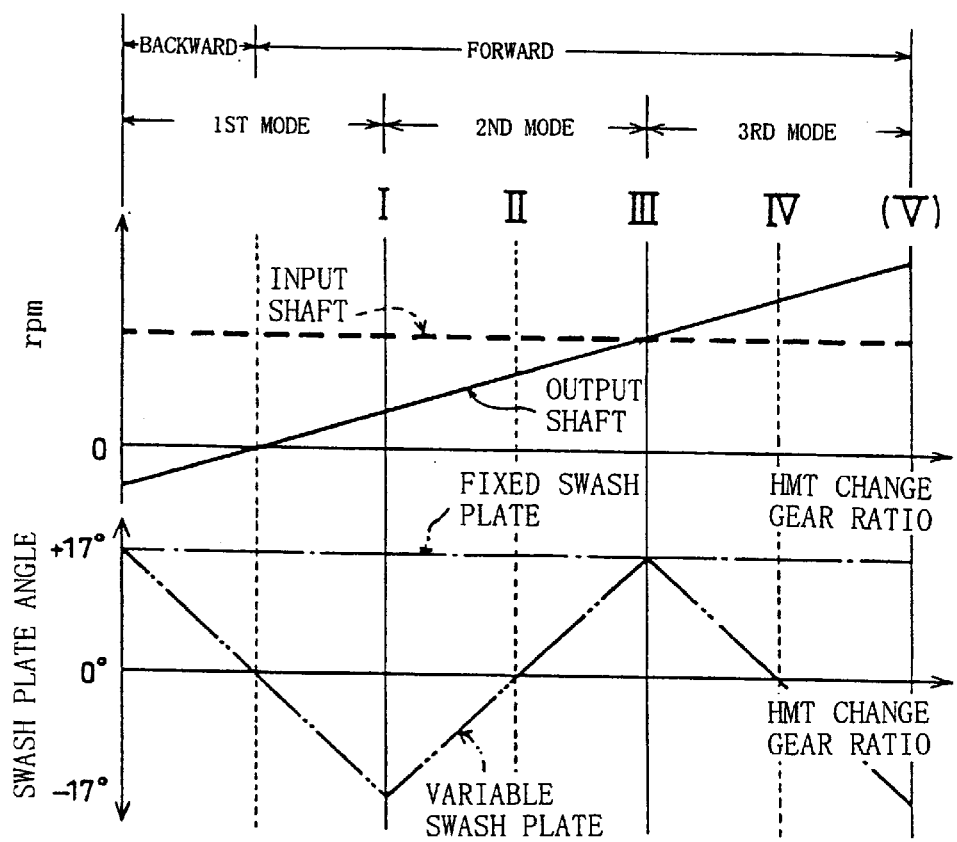
FIG. 2 is a graph for illustrating the relationship between a change gear ratio of an HMT and both swash plate angles of a variable swash plate of a hydraulic pump and a swash plate of a hydraulic motor and the relationship between the change gear ratio of the HMT and both rpm of input and output shafts in a manner to relate each other.
Figure 3:
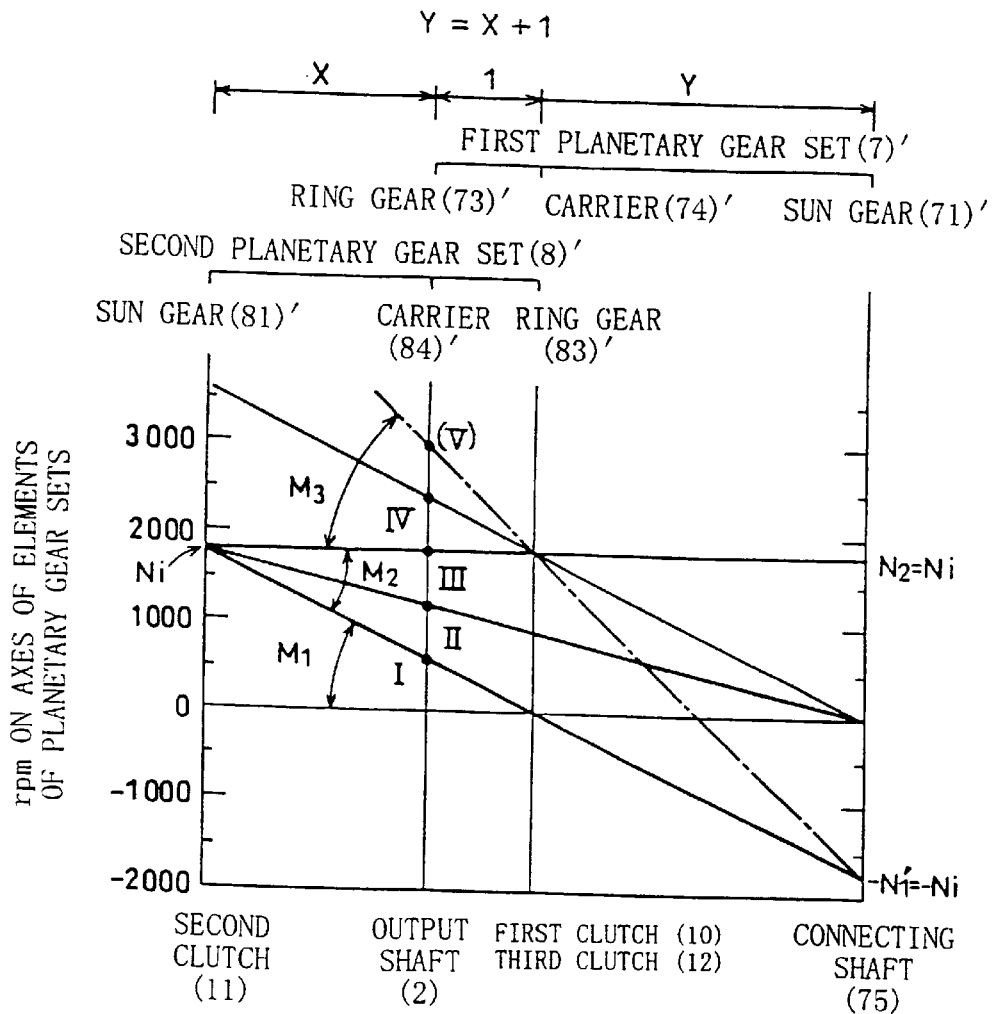
FIG. 3 is a planetary speed diagram of first and second planetary gear sets in FIG. 1.
Figure 4:
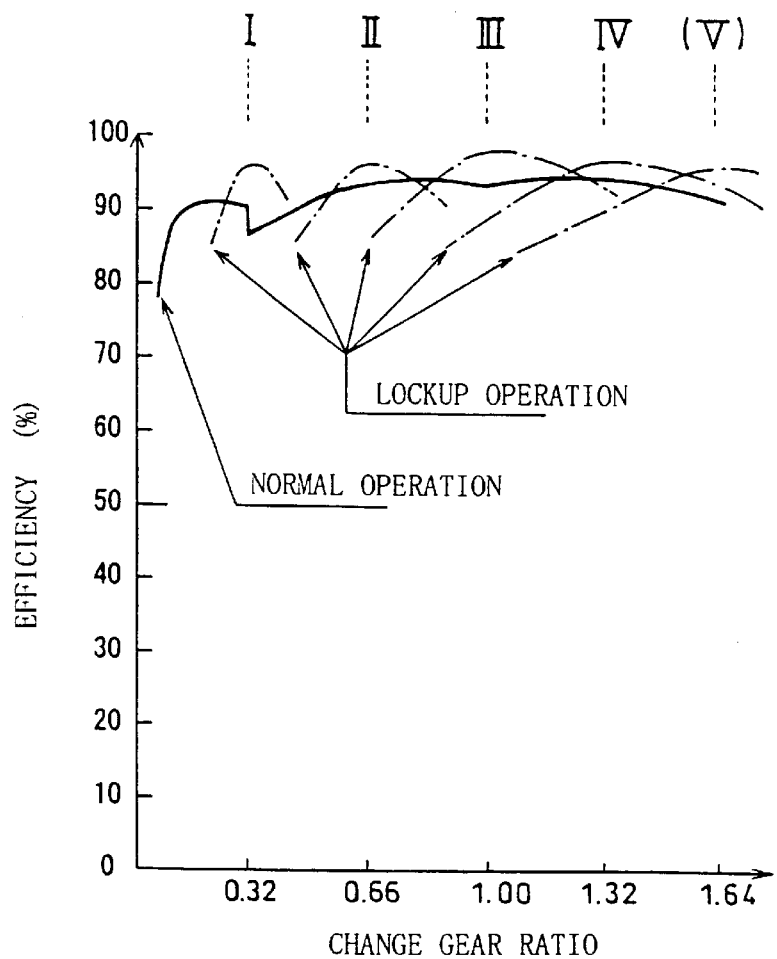
FIG. 4 is a graph showing the relationship between the change gear ratio and the efficiency in a normal operation and a lockup operation, where the conventional steplessly variable speed transmission is premised.
Figure 5:
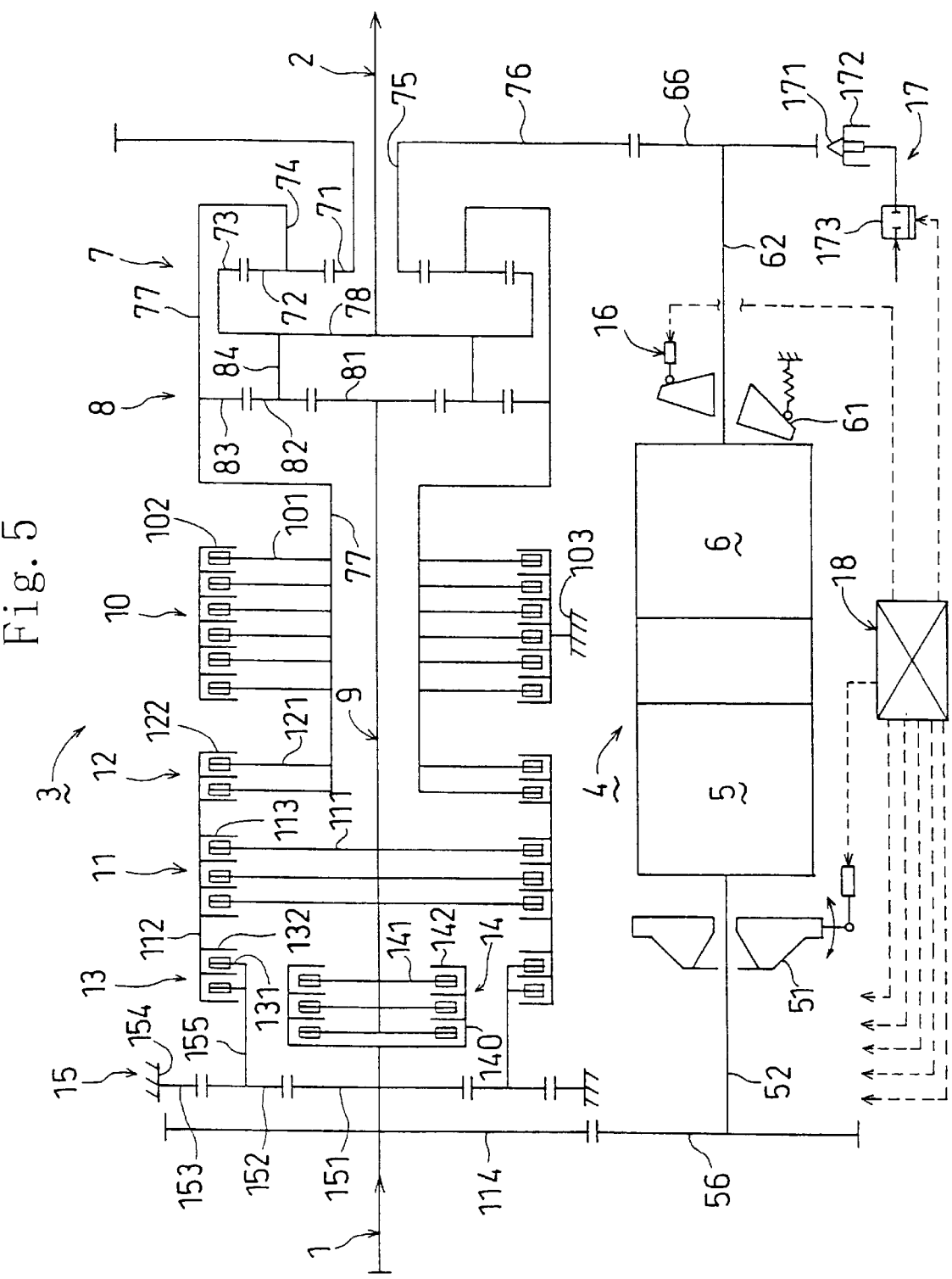
FIG. 5 is a schematic diagram of the entire steplessly variable speed transmission according to an embodiment of the present invention.
Figure 6:
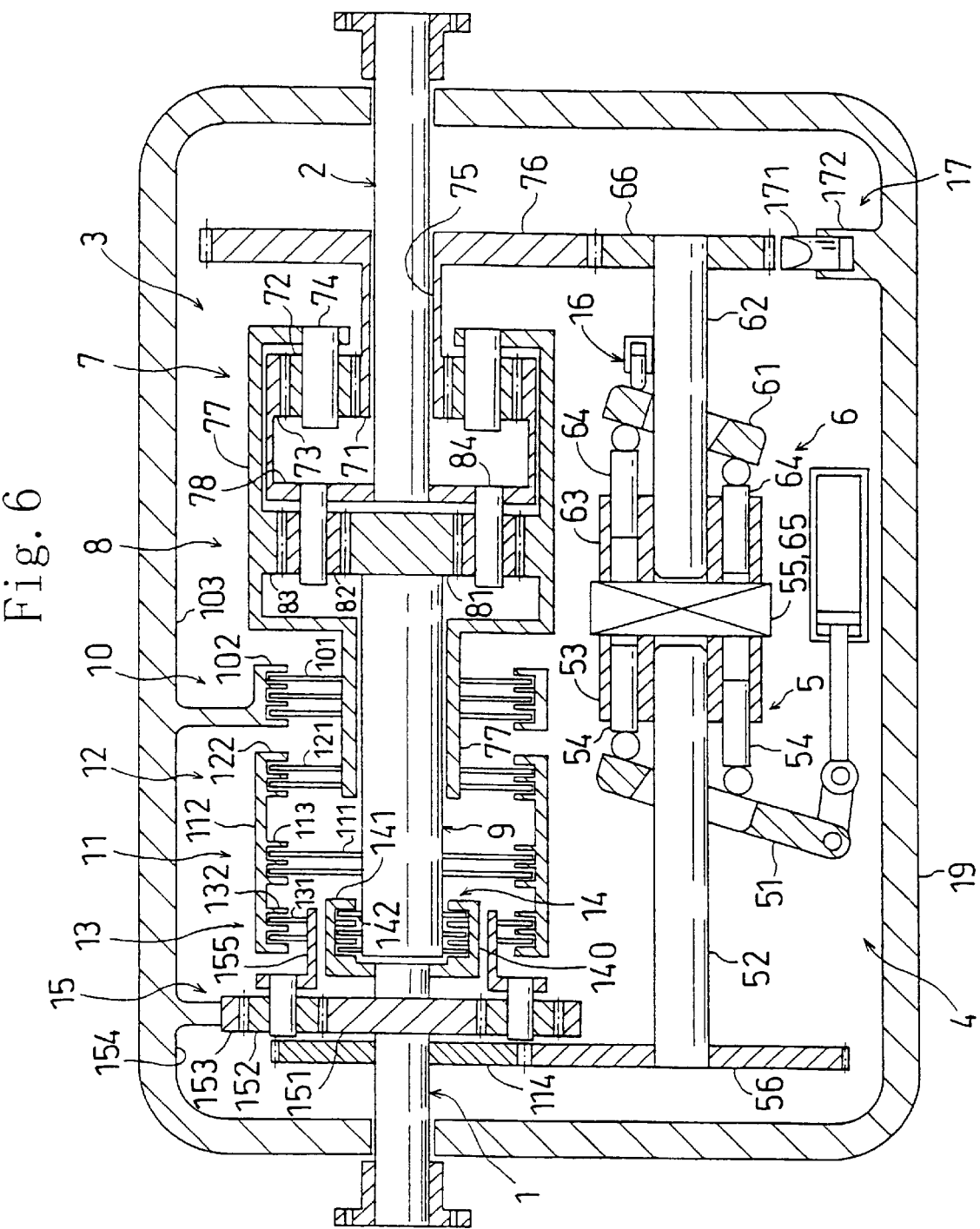
FIG. 6 is a partly cutaway front view showing the steplessly variable speed transmission of FIG. 5 in a simplified manner.

FIGS. 5 and 6 show an HMT as a steplessly variable speed transmission according to an embodiment of the present invention. In the figure, a reference numeral 1 denotes an input shaft 1 which is connected to an engine (not shown) as a drive source and to which rotation is applied from the engine at constant rpm, a reference numeral 2 denotes an output shaft connected to a drive wheel (not shown) or the like through a final reduction gearing (not shown), and a reference numeral 3 denotes an MT as a mechanical transmission interposed between the input shaft 1 and the output shaft 2. Further, a reference numeral 4 denotes an HST as a hydrostatic transmission placed in parallel with the input shaft 1, the MT 3 and the output shaft 2. The HST 4 includes: a hydraulic pump 5 located on an input side and having a variable swash plate 51; and a hydraulic motor 6 located on an output side and having a swash plate 61 mainly held at the maximum swash plate angle. Furthermore, a reference numeral 15 denotes a third planetary gear set as an input rpm reduction mechanism for reducing the rpm of the input shaft 1 and inputting the rotation to the input side of the MT 3 at the reduced rpm, a reference numeral 13 denotes a fourth selectively-engageable clutch for putting a speed reduction function of the third planetary gear set 15 into operation, and a reference numeral 14 denotes a fifth selectively-engageable clutch for putting the speed reduction function of the third planetary gear set 15 into non-operation. The fourth and fifth clutches (13, 14) form a switching mechanism for switching the speed reduction function of the third planetary gear set 15 between operation and non-operation. In addition, a reference numeral 18 denotes a controller including an increase/decrease control means and a lockup operation control means.

Structure of MT

The MT 3 includes a first planetary gear set 7, a second planetary gear set 8, an intermediate shaft 9 and first to third selectively-engageable clutches (10, 11, 12). The fourth and fifth clutches 13, 14 and the third planetary gear set 15 are provided on the input side of the MT 3. Below, each of the above mechanisms (7, 8, 10, 11, 12, 13, 14, 15) will be described in detail.

The first planetary gear set 7 includes a first sun gear 71, a first planet gear 72 engaged with the first sun gear 71, a first ring gear 73 engaged with the first planet gear 72, and a first carrier 74 for holding the first planet gear 72. The second planetary gear set 8 includes a second sun gear 81 formed on the intermediate shaft 9, a second planet gear 82 engaged with the second sun gear 81, a first ring gear 83 engaged with the second planet gear 82, and a second carrier 84 for holding the second planet gear 82.

The first sun gear 71 is formed integrally with a gear 76 through an annular connecting shaft 75 relatively rotatably fitted onto the output shaft 2, and is connected to the hydraulic motor 6 through the gear 76 and the below-mentioned gear 66. The first carrier 74 is affixed to a tubular member 77 and the second ring gear 83 is formed on the inner periphery of the tubular member 77. Such a structure allows the first planet gear 72 and the second ring gear 83 to rotate in synchronism with each other. Further, the first ring gear 73 is formed on the outer periphery of a flange-shaped member 78, the second carrier 84 is affixed to the flange-shaped member 78, and the flange-shaped member 78 is affixed integrally to the output shaft 2. This structure allows the second planet gear 82 to rotate in synchronism with the first ring gear 73 and allows the first ring gear 73 and the second planet gear 82 to be connected to the output shaft 2.

The first clutch 10 includes a plurality of clutch plates 101 and a plurality of pressure plates 102 for sandwiching the clutch plates 101 individually thereamong. Each of the pressure plates 102 is fixed to a non-rotating part 103 as a casing 19 (shown in FIG. 6 only) of the HMT in a state that its rotation relative to the non-rotating part 103 is prevented. Thereby, the first clutch 10 in engagement generates a braking force. Each of the clutch plates 101 is affixed around the tubular member 77, which allows the first clutch 10 to connect the first planet gear 72 and the second ring gear 83 to the non-rotating part 103 in a manner capable of switch between engagement and disengagement.

The second clutch 11 includes a plurality of clutch plates 111 affixed around the intermediate shaft 9 and pressure plates 113 provided on the inner periphery of a cylindrical member 112. The cylindrical member 112 is connected to the input shaft 1 through the fourth clutch 13 and the third planetary gear set 15, so that the second clutch 11 transmits rotation, applied from the fourth clutch 13 in engagement at reduced rpm, to the second sun gear 81 in a manner capable of switch between engagement and disengagement therewith.

The third clutch 12 includes a plurality of clutch plates 121 affixed around the tubular member 77 and pressure plates 122 provided on the inner periphery of the cylindrical member 112, thereby transmitting rotation at reduced rpm to the first planet gear 72 and the second ring gear 83 in a manner capable of switch between engagement and disengagement therewith.

The third planetary gear set 15 includes a third sun gear 151, fixed to the input shaft 1 and arranged in parallel with the below-mentioned gear 114, a third planet gear 152 engaged with the third sun gear 151, a third ring gear 153, engaged with the third planet gear 152 and fixed to a non-rotating part 154 as the above-mentioned casing 19 in a state that relative rotation thereto is prevented, and a third carrier 155 for holding the third planet gear 152. Each of the gears (151, 152, 153) of the third planetary gear set 152 is set at the number of teeth such that the third carrier 155 is rotated at reduced rpm obtained by reducing the input rpm of the input shaft 1 applied to the third sun gear 151 at a specified reduction gear ratio.

The fourth clutch 13 includes a plurality of clutch plates 131 affixed around the third carrier 155 and pressure plates 132 provided on the inner periphery of the cylindrical member 112. When put into engagement, the fourth clutch 13 transmits rotation to the cylindrical member 112 as the input-side end of the second and third clutches (11, 12) at the above reduced rpm.

In addition, the fifth clutch 14 includes an annular member 140 fixed at the extremity of the input shaft 1, pressure plates 142 provided on the inner periphery of the annular member 140, and a plurality of clutch plates 141 affixed around the intermediate shaft 9. When put into engagement, the fifth clutch 14 directly connects the second sun gear 81 to the input shaft 1 through the intermediate shaft 9 to transmit rotation of the input shaft 1 to the second sun gear 81 at the rpm of the input shaft 1.

Under the above structure, the first and second planetary gear sets (7, 8) and the third planetary gear set 15 are set such that the below-mentioned relationship establishes among the gear ratios of the first and second planetary gear sets (7, 8) and the reduction gear ratio of the third planetary gear set 15. This gives power transmission ratios substantially continuous between before and after each mode switch among the first to fourth modes. More specifically, as shown in the planetary speed diagram of FIG. 7, when the gear ratio between the first sun gear 71 and the first ring gear 73 is Y and the gear ratio between the second sun gear 81 and the second ring gear 83 is X, the relationship of Y=X+1 establishes. In addition, the reduction gear ratio is set to take a value represented by Y/(2X+Y+2). In this embodiment, the gear ratio X is set at approximately 2 and therefore the gear ratio Y is set at approximately 3. As a result, the reduction gear ratio is set at approximately ⅓. Accordingly, when the input rpm from the input shaft 1 is Ni, the reduced rpm Nir becomes Ni/3.

Structure of HST

The HST 4 consists of a pair of hydraulic units substantially identical in structure with each other. The hydraulic unit on the input side for inputting a rotational force from the engine is called a hydraulic pump 5, and a hydraulic unit on the output side for outputting a rotational force after speed-changed is called a hydraulic motor 6.

Figure 8:
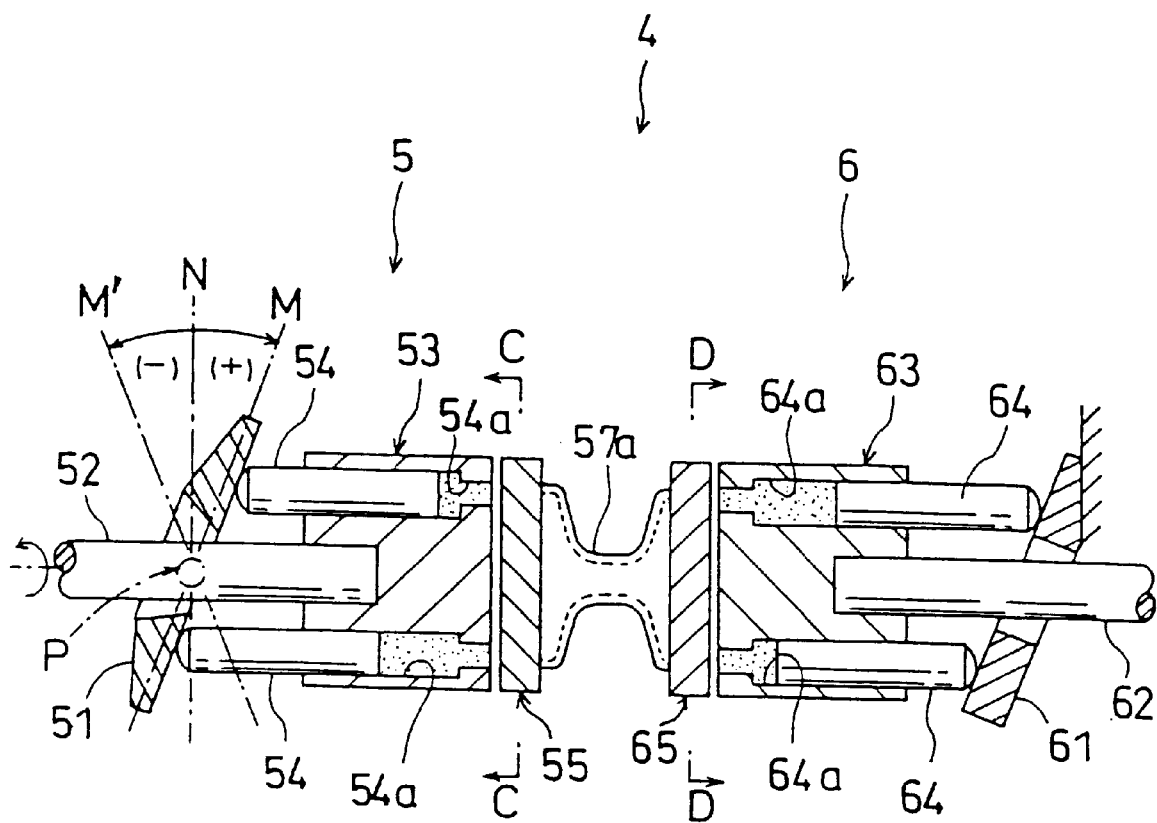
FIG. 8 is a schematic longitudinally cross-sectional view showing an HST.
Figure 9:
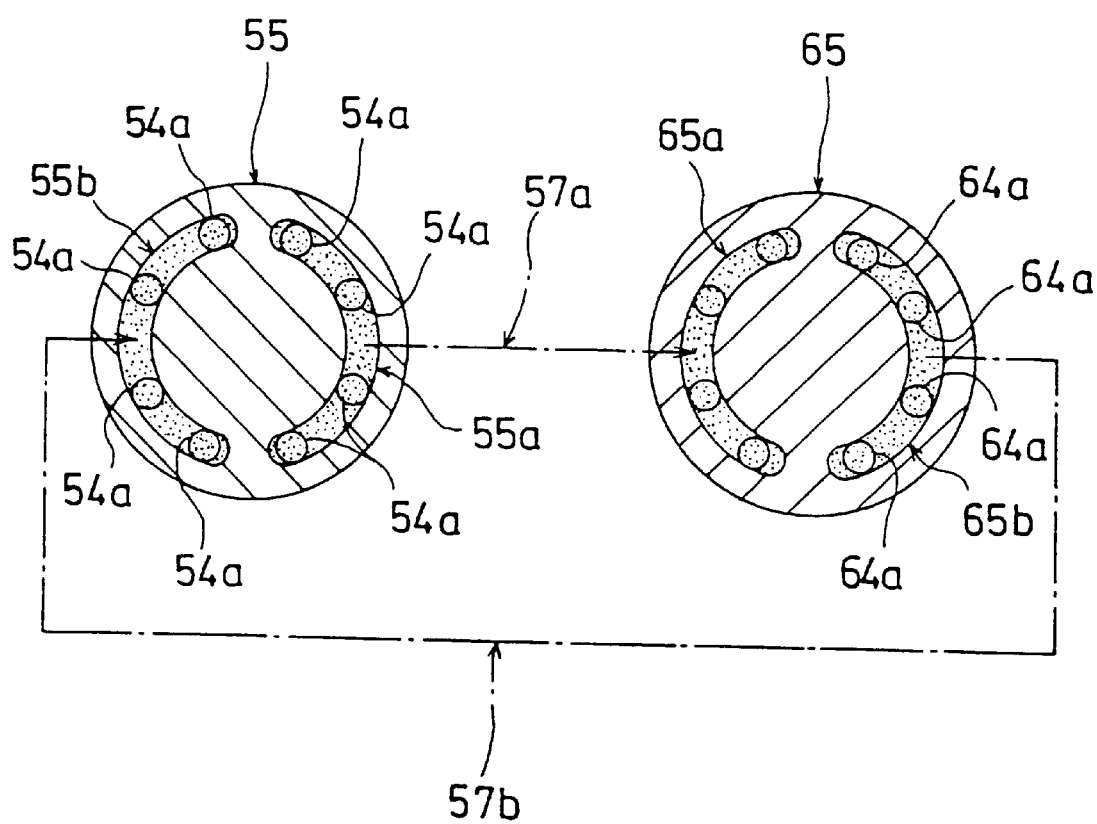
FIG. 9 is a diagram for illustrating both non-rotating blocks taken along the lines C—C and D—D in FIG. 8.

As shown also in FIG. 8, the hydraulic pump 5 includes a cylinder block 53 rotating together with a pump shaft 52 through a spline, a plurality of reciprocating pistons (54, 54, . . . ), contained in the cylinder block 53 and arranged in columns in a circumferential direction, a non-rotating block 55 non-rotatably coupled to the cylinder block 53 with a full of hydraulic liquid contained therebetween, and the variable swash plate 51 for controlling reciprocation of the plurality of reciprocating pistons (54, 54, . . . ). A gear 56 coupled to the pump shaft 52 is engaged with the gear 114 of the input shaft 1, so that a rotational force from the engine is applied to the pump shaft 52 through the input shaft 1. Inside of the non-rotating block 55, two arcuate openings (55a, 55b) (i.e., A kidney and B kidney; See FIG. 9) are formed so as to be communicable with each cylinder room 54a of the plurality of reciprocating pistons (54, 54, . . . ). Either one of the A kidney 55a and the B kidney 55b is communicated with either one of corresponding A kidney 65a and B kidney 65b of the below-mentioned non-rotating block 65 of the hydraulic motor 6 through connection pipes 57a, 57b, respectively.

Further, the variable swash plate 51 is inclinable between both maximum inclined angle positions M, M'), in each of which the variable swash plate 51 takes a maximum swash plate angle (for example, 17 degrees), passing through a neutral position N where the swash plate angle is zero degree. The swash plate angle of the variable swash plate 51 is continuously changed increasingly or decreasingly at specified rates of increase or decrease respectively corresponding to the first to fourth modes of operation by the increase/decrease control means in the controller 18. Further, the variable swash plate 51 is kept at the neutral position or the maximum swash plate angle position by receiving a control signal from the lockup operation control means in the controller 18.

The hydraulic motor 6 includes a cylinder block 63 rotatable together with the motor shaft 62 through a spline, plurality of reciprocating pistons (64, 64, . . . ), contained in the cylinder block 63 and arranged in columns in a circumferential direction, a non-rotating block 65 non-rotatably coupled to the cylinder block 63 with a full of hydraulic liquid contained therebetween, and the swash plate 61 for controlling reciprocation of the plurality of reciprocating pistons (64, 64, . . . ). The gear 66 coupled to the motor shaft 62 is engaged with the gear 76 coupled to the connecting shaft 75 integral with the first sun gear 71, so that a rotational force from the motor shaft 62 is transmitted to the first sun gear 71. Inside of the nonrotating block 65, like the other non-rotating block 55, A kidney 65a and B kidney 65b (See FIG. 9) are formed so as to be communicable with each cylinder room 64a of the plurality of reciprocating pistons (64, 64, . . . ). The swash plate 61 is held at the maximum swash plate angle (17 degrees) in the first to third modes, and is switched to a different swash plate angle in the fourth mode by the swash plate angle changing means 16.

The swash plate angle changing means 16 is formed of an actuator operated by a hydraulic oil. The swash plate angle changing means 16 keeps the swash plate 61 in the maximum swash plate angle position in no operation. When the swash plate angle changing means 16 receives an operating signal from the controller 18, for example, a charge pressure is introduced, into the swash plate angle changing means 16, from a charge pump for supplying a charge oil to the HST 4, so that the swash plate angle changing means 16 pushes the wash plate 61 located in the maximum swash plate angle position to change the swash plate angle of the swash plate 61 to ⅓ of the maximum swash plate angle (17 degrees/3) and hold the swash plate in the changed position.

As shown in FIG. 5, around the gear 66 of the motor shaft 62, a rotation locking mechanism 17 is provided for locking the gear 66 into a rotation locking condition. The rotation locking mechanism 17 includes an engaging member 171 disengageably engaged with the teeth of the gear 66 so as to lock the gear 66 into no rotation, a cylinder 172 for putting the engaging member 171 into engagement and disengagement in a manner to advance and retract the engaging member 171 respectively, and a solenoid shut-off valve 173 for switchably supplying, for example, the charge pressure, to the cylinder 172. In the rotation locking mechanism 17, during normal operation, the solenoid shut-off valve 173 blocks the supply of the charge pressure to cause a pressure-released condition so that the engaging member 171 is positioned in the retracted position. On the other hand, during a specified lockup operation, the rotation locking mechanism 17 receives a control signal from the lockup operation control means in the controller 18 to cause the solenoid shut-off valve 173 to supply the charge pressure to the cylinder 172 so that the engaging member 171 is advanced to engage with the gear 66.

Here, the principle of operation of the HST 4 will be generally described. Even when rotation from the engine is transmitted to the pump shaft 52 through the input shaft 1, the gear 114 and the gear 56, each piston 54 does not perform the stroke in the case where the variable swash plate 51 is positioned in the neutral position N. Accordingly, a hydraulic fluid in each cylinder 54*a* is not discharged toward the hydraulic motor 6 so that the cylinder block 53 is put into a freewheeling condition. When the variable swash plate 51 is inclined toward the maximum inclined position M, each piston 54 performs the stroke according to the swash plate angle so that the hydraulic oil is discharged by a discharge amount corresponding to the stroke to each cylinder room 64*a* of the hydraulic motor 6 through one of the kidneys (55*a* or 55*b*) and one of the connection pipes (57*a* or 57*b*). Through the push of each piston 64 of the hydraulic motor 6 receiving the above discharge amount of hydraulic oil against the inclined swash plate 61, the cylinder block 63 rotates at rpm corresponding to the discharge amount of hydraulic oil and the rotation is transmitted to the first sun gear 71 through the motor shaft 62, the gear 66 and the gear 76. The hydraulic oil is returned from the cylinder block 63 to the hydraulic pump 5 through the other kidney (65*b* or 65*b*) and the other connection pipe (57*b* or 57*a*). At the time, when the variable swash plate 51 is positioned at a swash plate angle close to the (+) side maximum inclined position M, the cylinder block 63 of the hydraulic motor 6 normally rotates in a direction identical with the input rotation. On the contrary, when the variable swash plate 51 is positioned at a swash plate angle close to the (−) side maximum inclined position M', the cylinder block 63 rotates in a direction opposite to the input rotation.

In the above description, a freewheeling operation mechanism for lockup operation is formed such that the increase/decrease control means 13 keeps the variable swash plate 51 in the neutral position or the maximum swash plate angle position. The operation of the freewheeling operation mechanism, the switch of the first to fifth clutches (10–14) between engagement and disengagement and the operation of the rotation locking mechanism 17 are controlled by the lockup operation control means in the controller 18.

Operations of MT and HST in Normal Operation

The MT 3 and the HST 4 are controlled in four modes of operation divided according to the change gear ratios, i.e., in a first mode of operation covering from the start to a low change gear ratio range (low speed range), a second mode of operation covering a lower intermediate change gear ratio range (lower intermediate speed range), a third mode of operation covering a higher intermediate change gear ratio range (higher intermediate speed range) and a fourth mode of operation covering a high change gear ratio range (high speed range).

Below, description will be made about the control of switch between engagement and disengagement of each of the clutches (10–14) in each mode of operation of the MT 3 basically with reference to FIG. 10 and also with reference to FIGS. 11 to 14.

Figure 11:
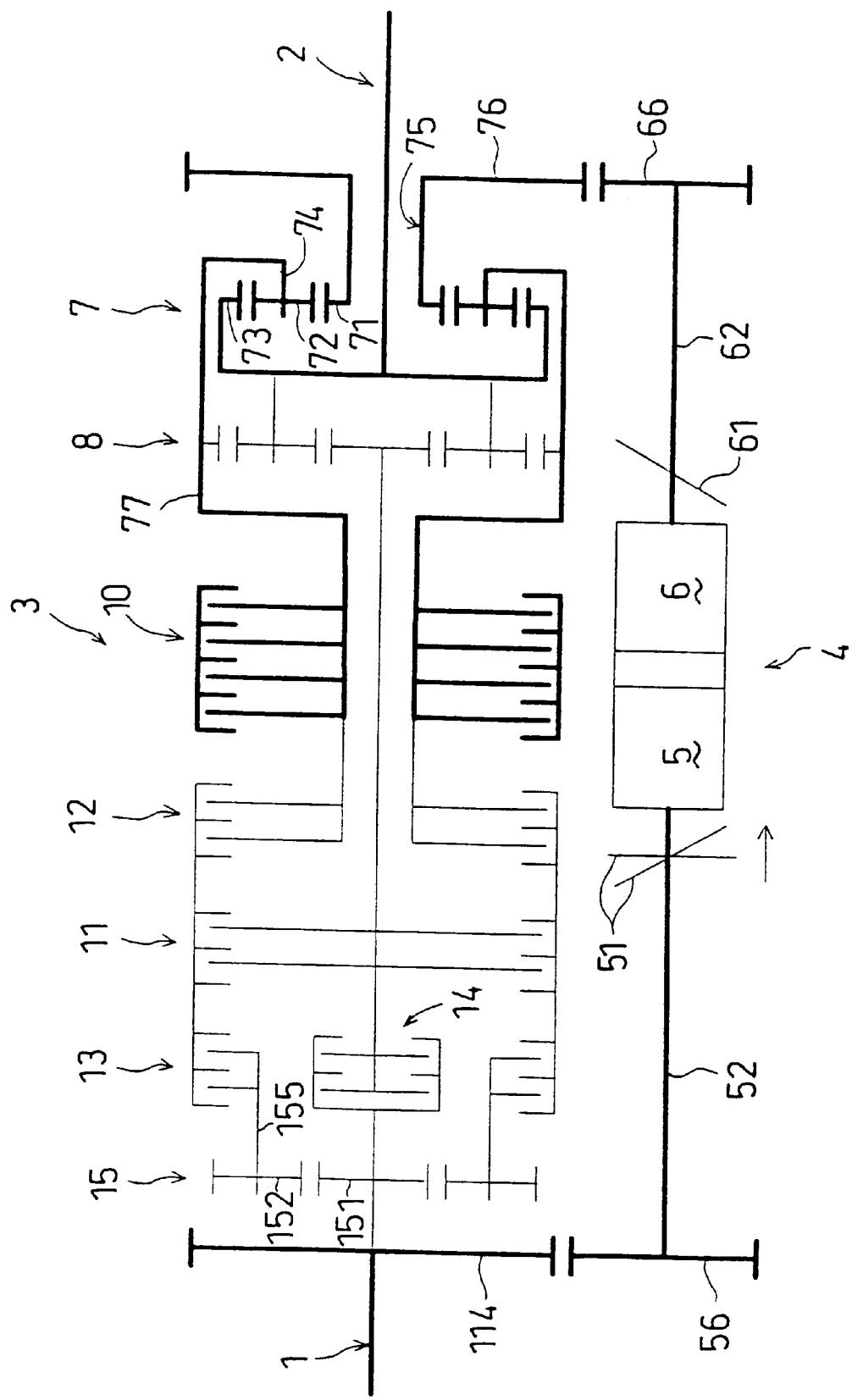
FIG. 11 is a schematic diagram showing a state of transmission of a rotational force in the first mode in accordance with FIG. 5.

In the first mode, only the first clutch 10 and the fourth clutch 13 are put into engagement, so that rotation applied from the input shaft 1 is transmitted only to the HST 4 at the input shaft rpm Ni as shown by a path represented by the bold line in FIG. 11. Accordingly, the output shaft 2 is rotated by a force only transmitted from the HST 4. On the other hand, in the MT 3, the fourth clutch 13 in engagement puts the cylindrical member 112 into a freewheeling condition, whereas the tubular member 77, to which the first planet gear 72 is integrally affixed, is connected to the non-rotating part 103 through the first clutch 10 so as to be locked into no rotation. Since the fourth clutch 13 simply freely rotates the cylindrical member 112 as mentioned above, it is necessarily required to put the fourth clutch 13 into engagement in the first mode. The reason for the engagement of the fourth clutch 13 in the first mode is that the engagement of the fourth clutch 13 necessary at the mode switch from the first mode to the second mode is readied.

Figure 12:
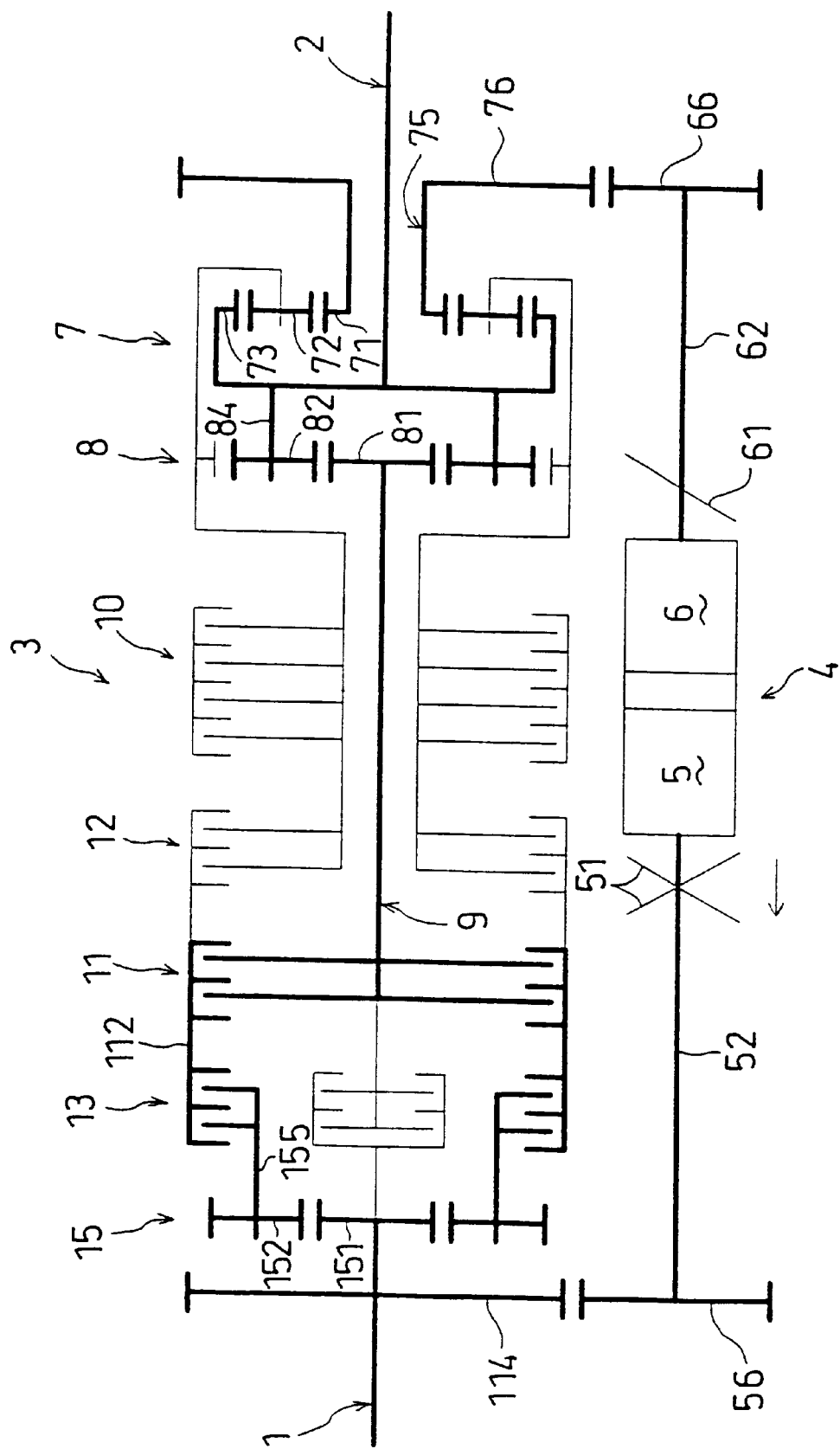
FIG. 12 is a schematic diagram showing a state of transmission of a rotational force in the second mode in accordance with FIG. 5.

In the second mode, only the second clutch 11 and the fourth clutch 13 are put into engagement, so that rotation applied from the input shaft 1 is transmitted to the HST 4 at the input shaft rpm Ni as shown by a path represented by the bold line in FIG. 12 and is transmitted to the intermediate shaft 9 at the reduced rpm Nir through the third planetary gear set 15, the fourth clutch 13 and the second clutch 11. The output shaft 2 is rotated by a force obtained by the synthesis of a force transmitted from the intermediate shaft 9 through the second planetary gear set 8 and a force transmitted from the HST 4 through the first planetary gear set 7.

Figure 13:
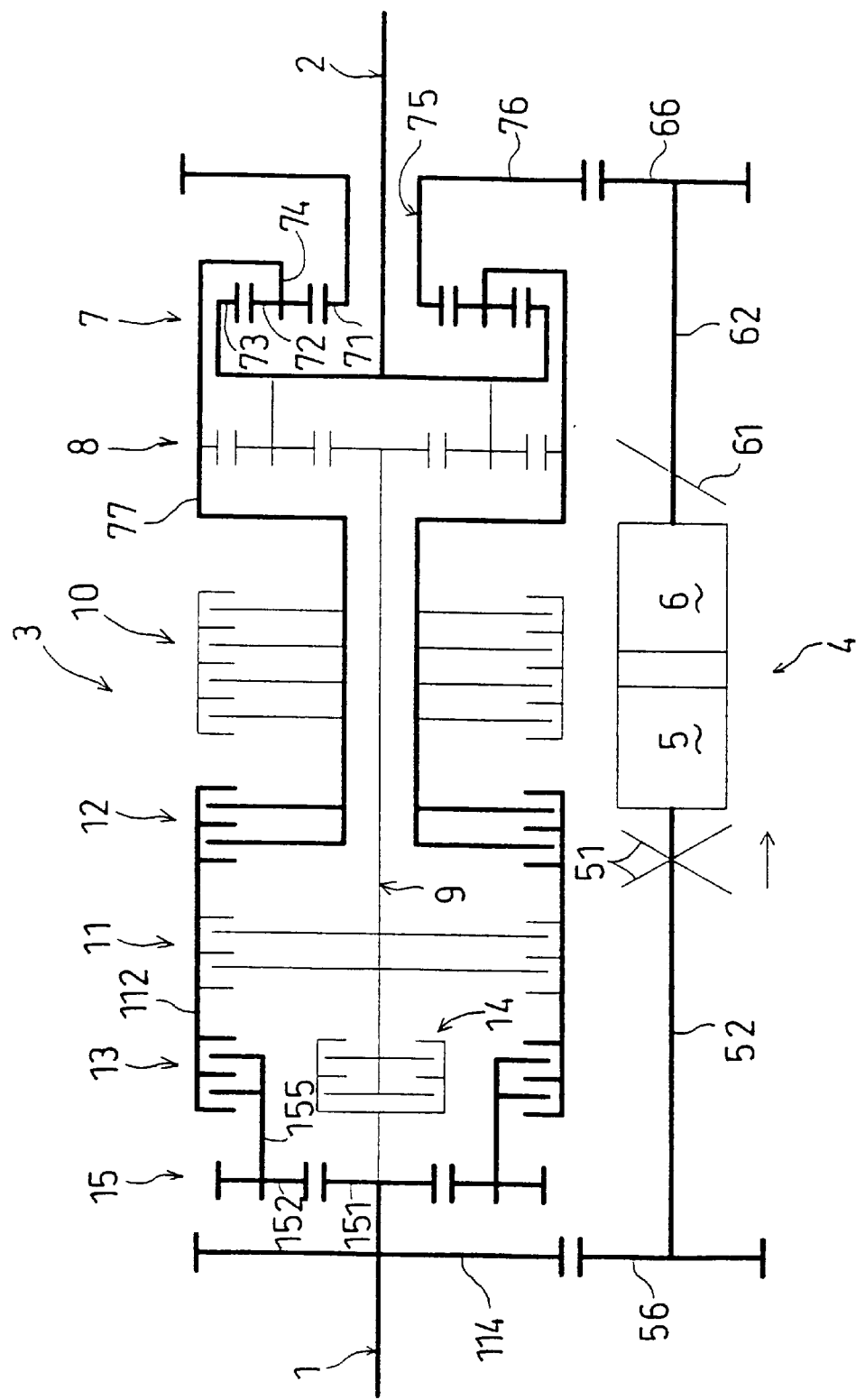
FIG. 13 is a schematic diagram showing a state of transmission of a rotational force in the third mode in accordance with FIG. 5.

In the third mode, only the third clutch 11 and the fourth clutch 13 are put into engagement, so that rotation applied from the input shaft 1 is transmitted to the HST 4 at the input shaft rpm Ni as shown by a path represented by the bold line in FIG. 13 and is transmitted to the tubular member 77 at the reduced rpm Nir through the third planetary gear set 15, the fourth clutch 13 and the third clutch 12. The output shaft 2 is rotated by a force obtained by the synthesis of a force transmitted from the tubular member 77 through the first planet gear 72 of the first planetary gear set 7 and a force transmitted from the HST 4 through the first sun gear 71 of the first planetary gear set 7.

Figure 14:
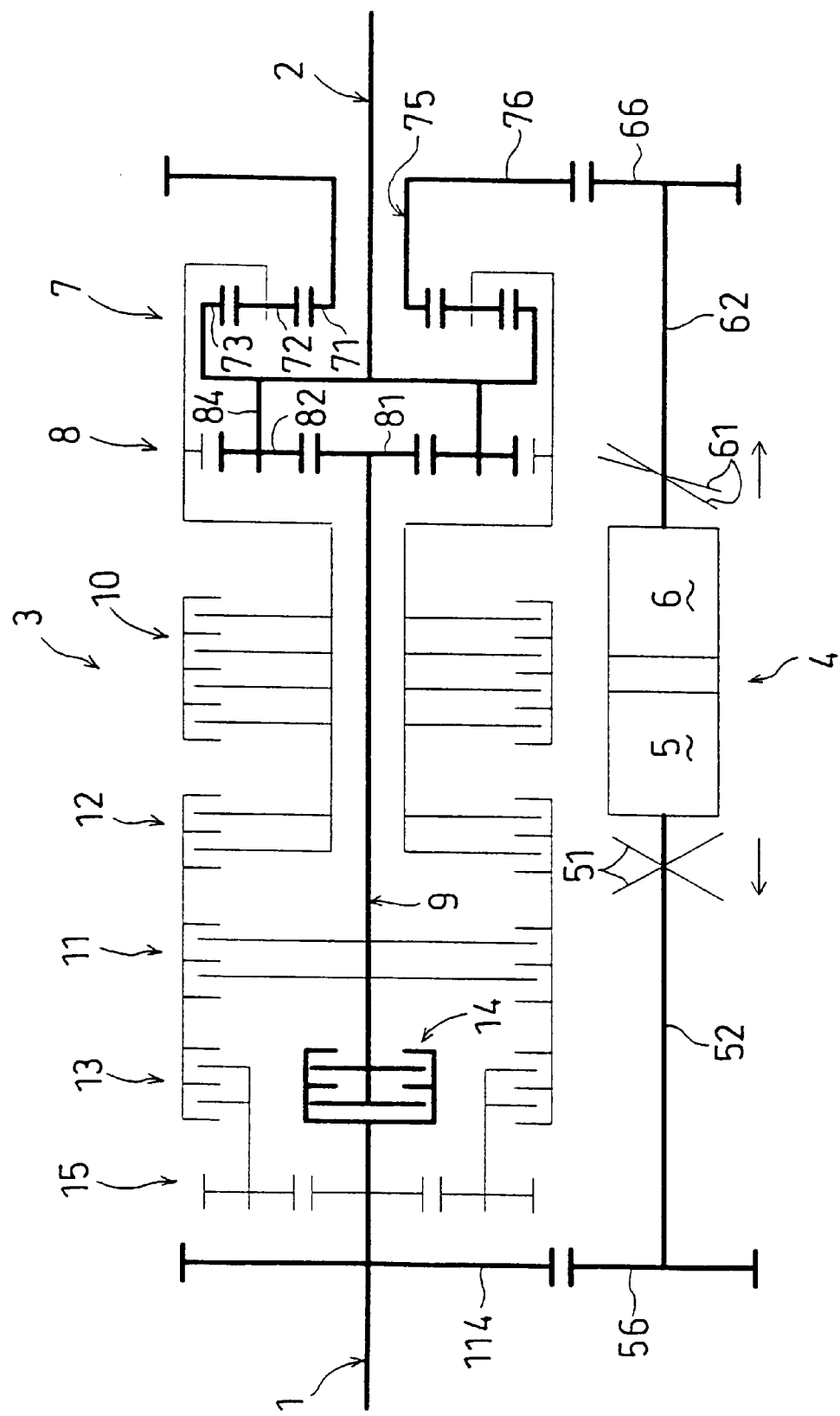
FIG. 14 is a schematic diagram showing a state of transmission of a rotational force in the fourth mode in accordance with FIG. 5.
Figure 15:
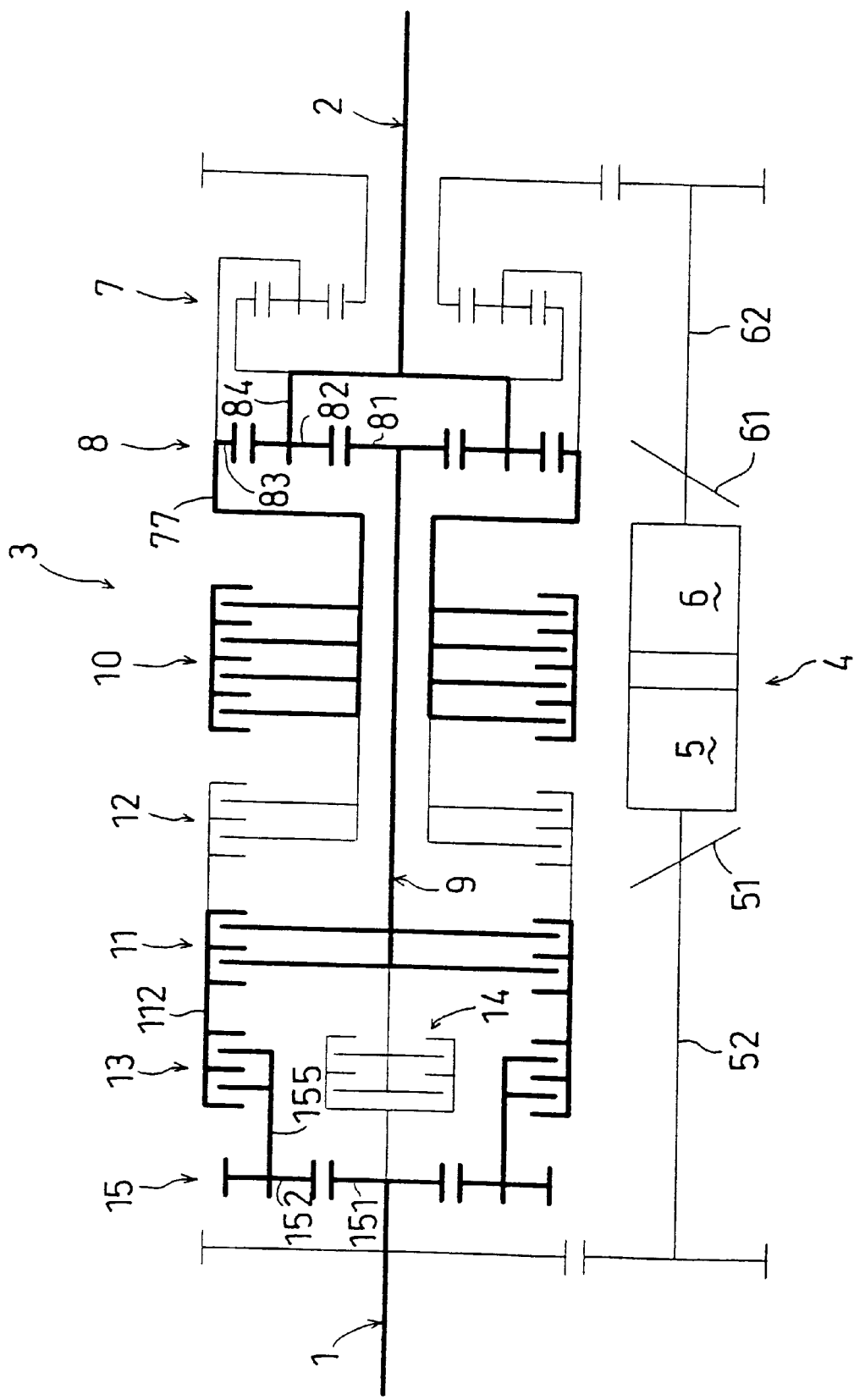
FIG. 15 is a schematic diagram showing a state of transmission of a rotational force during lockup operation at rpm ① in accordance with FIG. 5.
Figure 16:
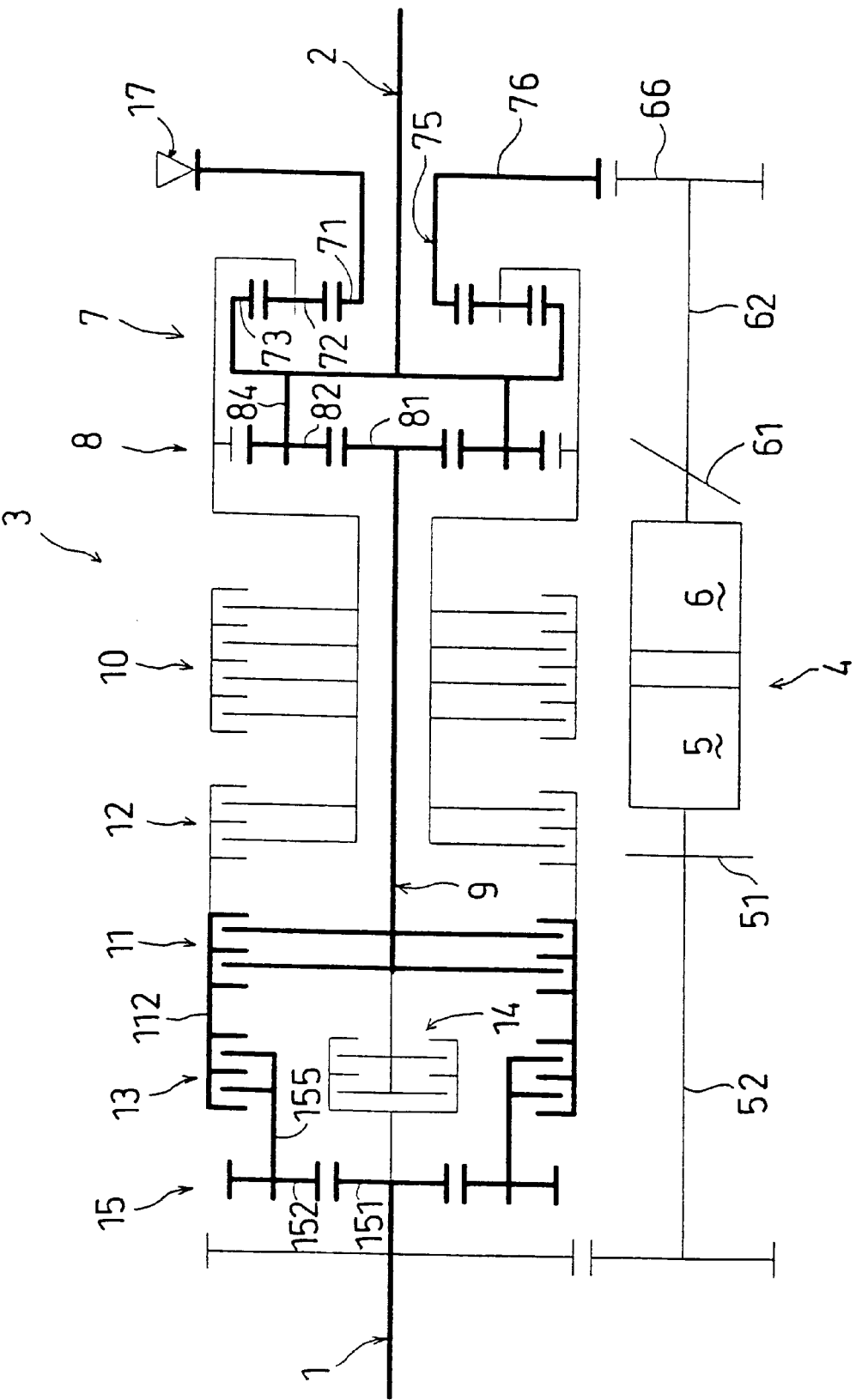
FIG. 16 is a schematic diagram showing a state of transmission of a rotational force during lockup operation at rpm ② in accordance with FIG. 5.
Figure 17:
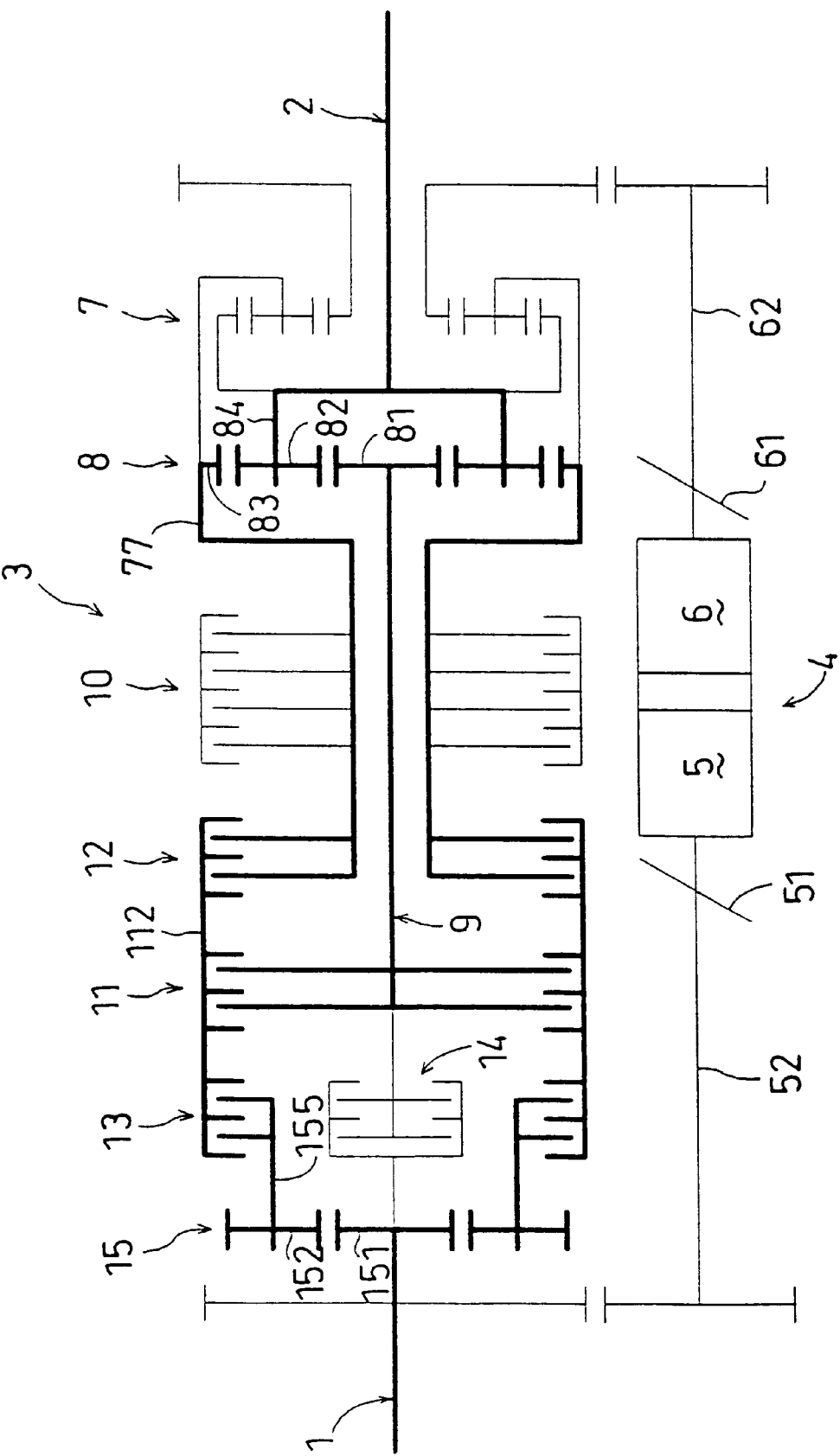
FIG. 17 is a schematic diagram showing a state of transmission of a rotational force during lockup operation at rpm ③ in accordance with FIG. 5.
Figure 18:
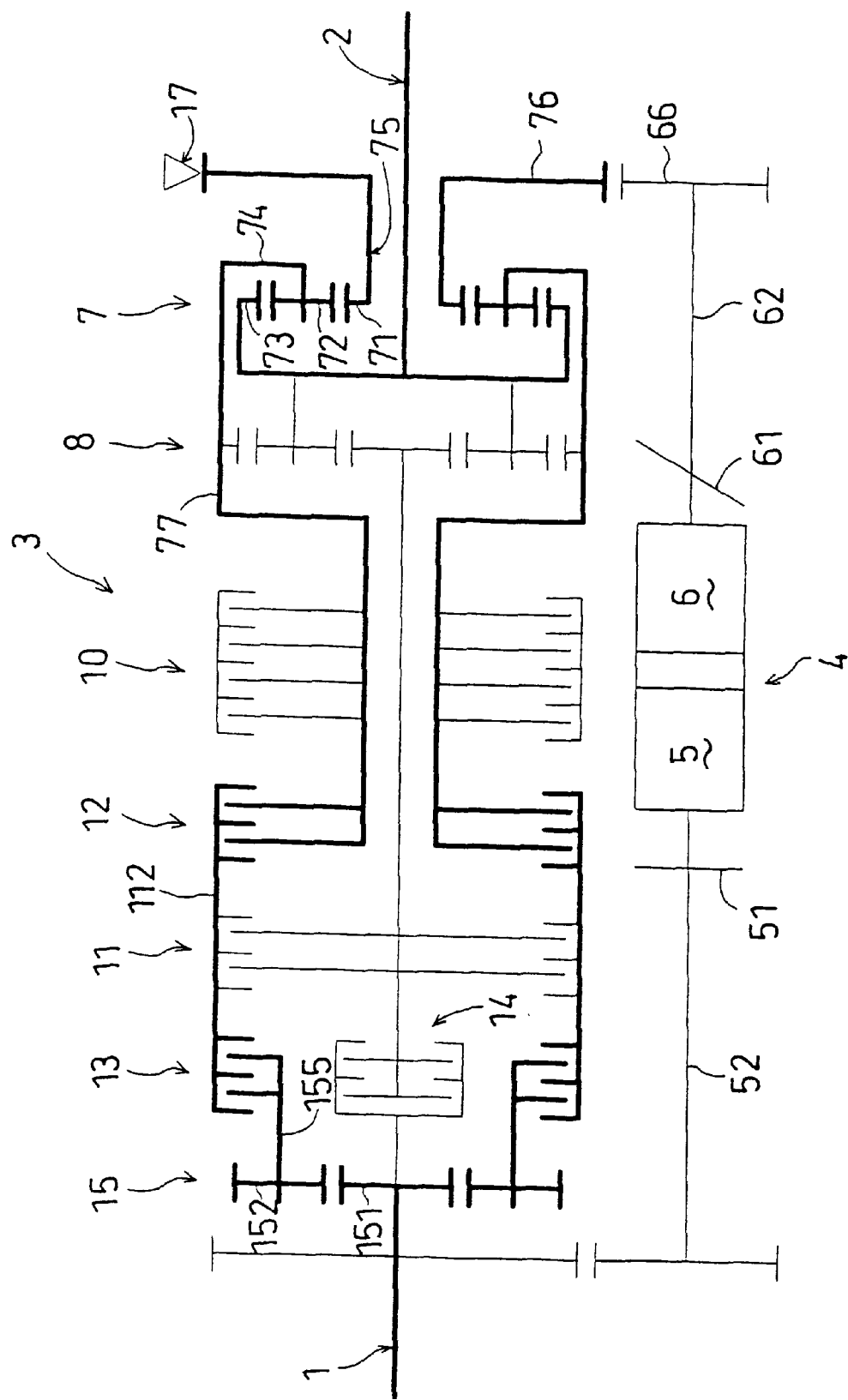
FIG. 18 is a schematic diagram showing a state of transmission of a rotational force during lockup operation at rpm ④ in accordance with FIG. 5.
Figure 19:
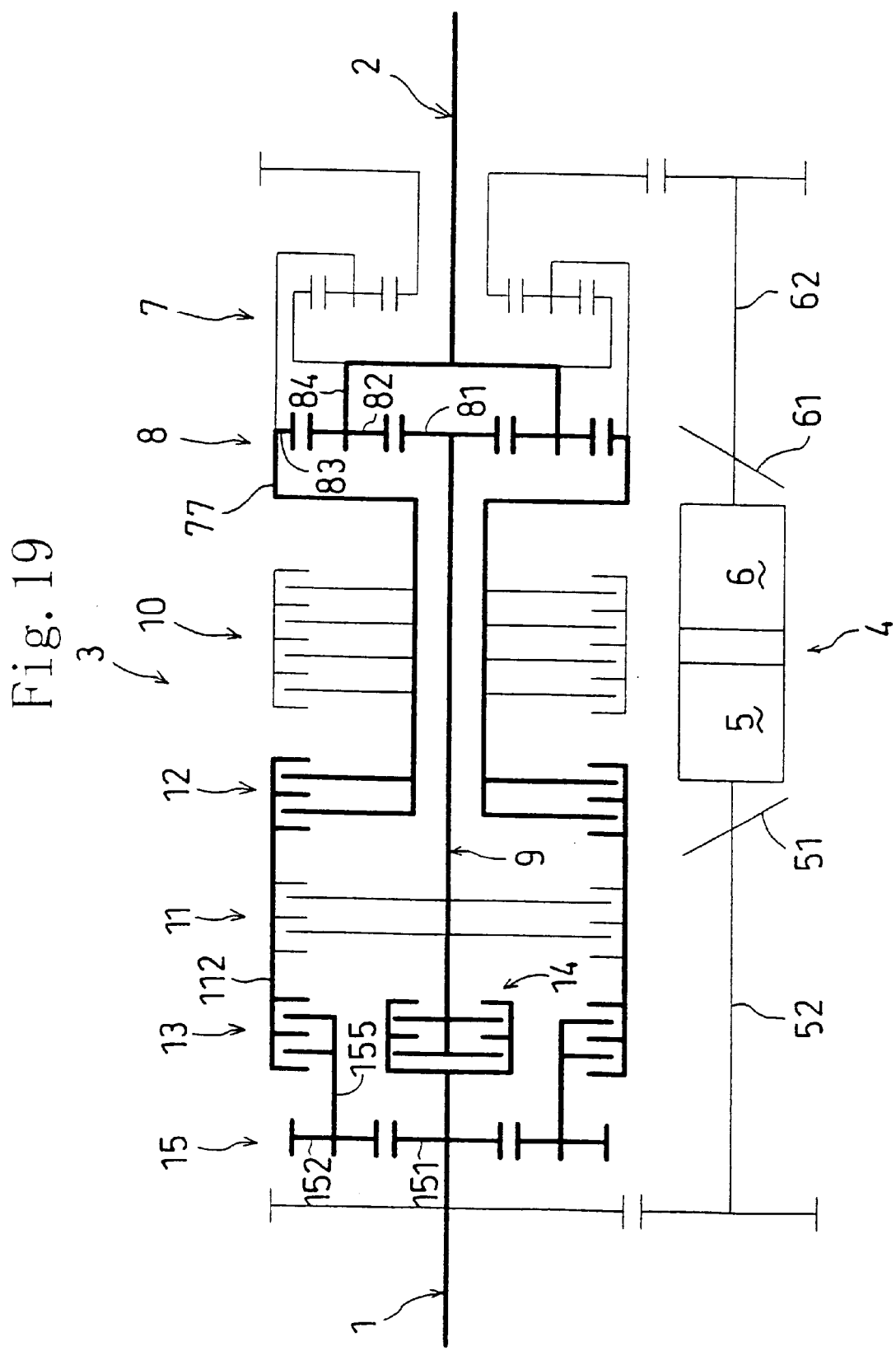
FIG. 19 is a schematic diagram showing a state of transmission of a rotational force during lockup operation at rpm ⑤ in accordance with FIG. 5.
Figure 20:
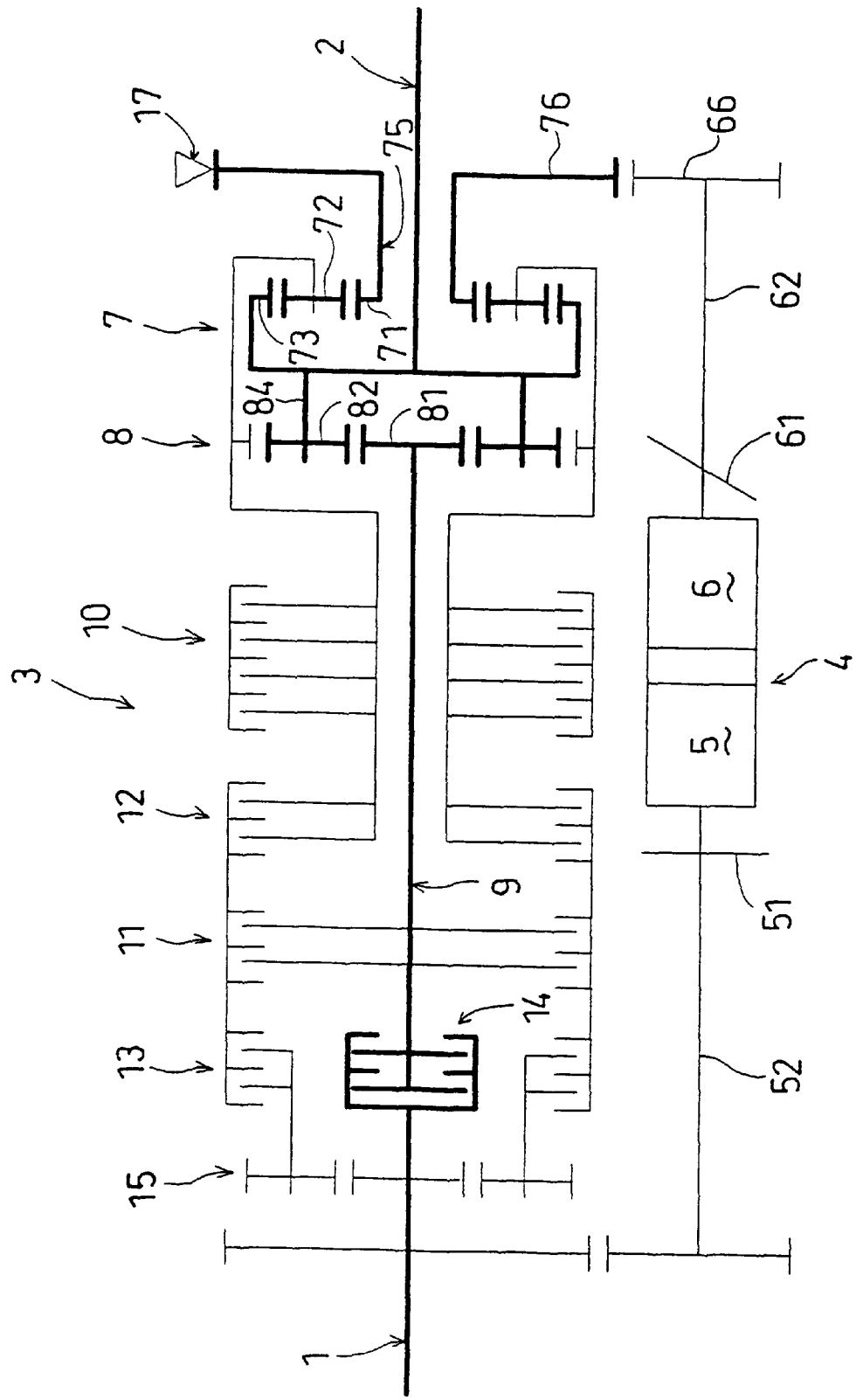
FIG. 20 is a schematic diagram showing a state of transmission of a rotational force during lockup operation at rpm ⑥ in accordance with FIG. 5.
Figure 21:
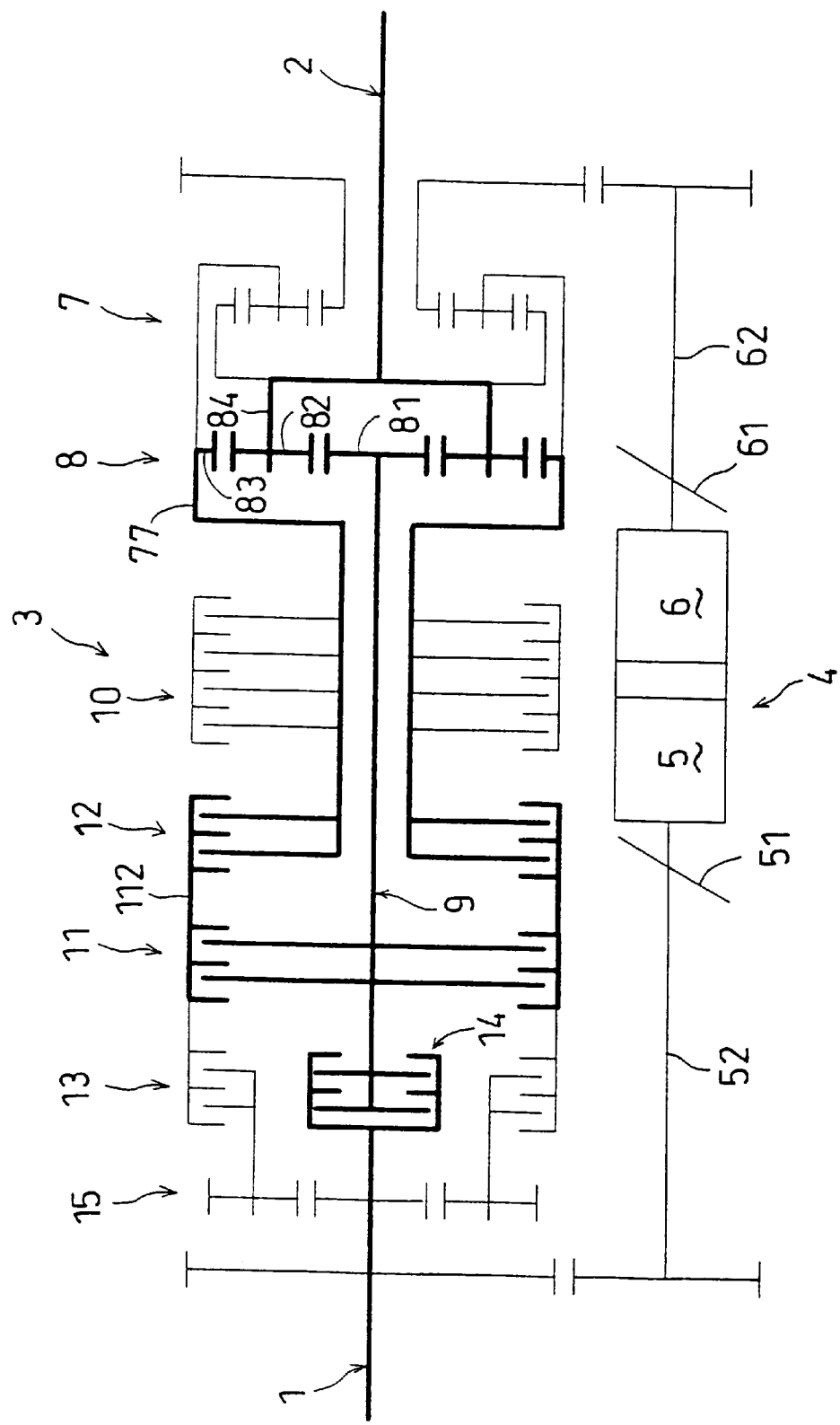
FIG. 21 is a schematic diagram showing a state of transmission of a rotational force during lockup operation at rpm ⑦ in accordance with FIG. 5.

In the fourth mode, only the fifth clutch 14 is put into engagement, so that rotation applied from the input shaft 1 is transmitted to the HST 4 at the input shaft rpm Ni as shown by a path represented by the bold line in FIG. 14 and is transmitted to the second sun gear 81 at the input shaft rpm Ni through the fifth clutch 14. The output shaft 2 is rotated by a force obtained by the synthesis of a force transmitted from the second carrier 84 of the second planetary gear set 8 and a force transmitted from the HST 4 through the first sun gear 71 of the first planetary gear set 7.

Figure 10:
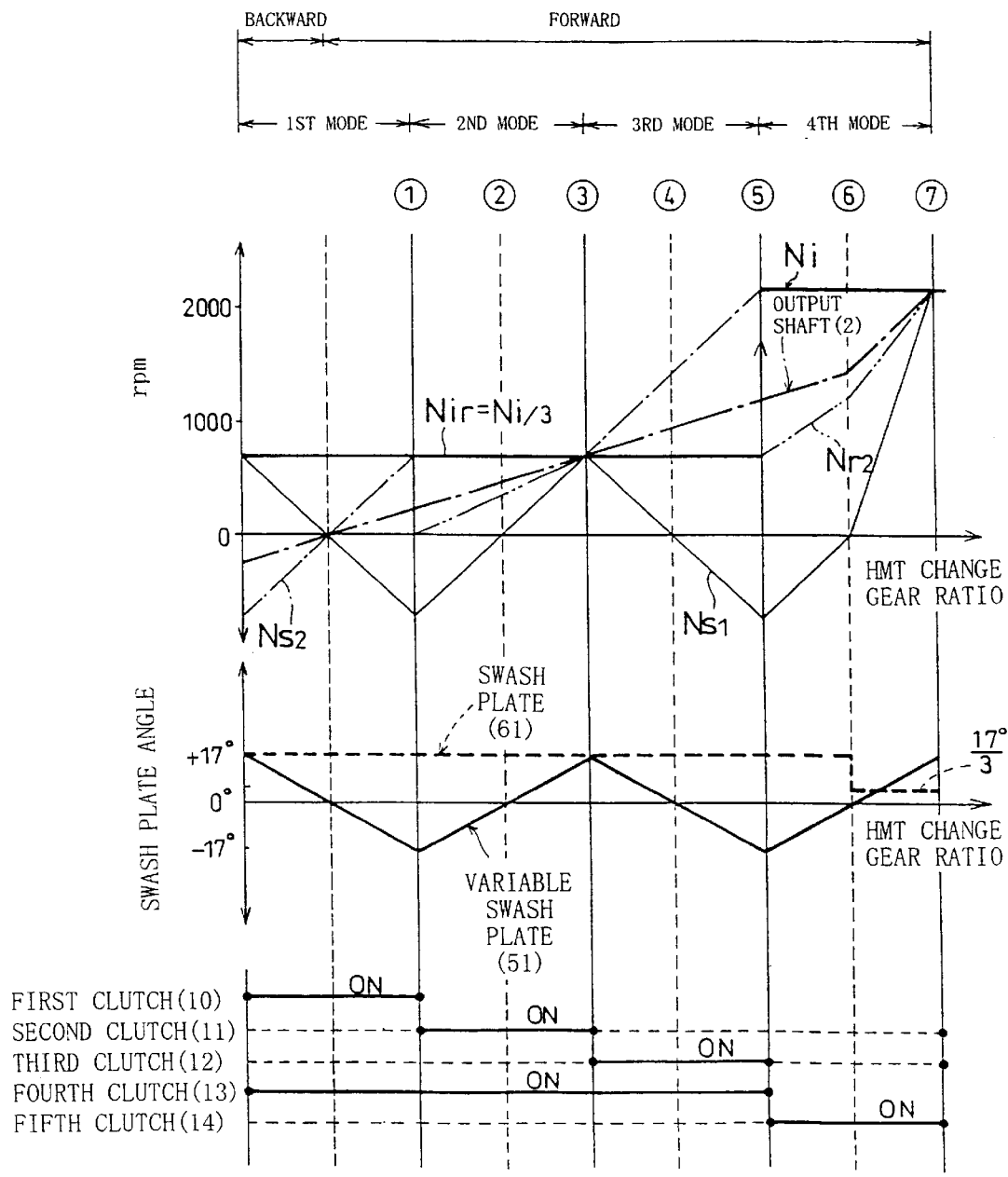
FIG. 10 is a graph showing relationships among the rpm of the output shaft and the like, both swash plate angles of the variable swash plate and the swash plate, the operational conditions of the clutches and the change gear ratio of the HMT.

Through the above-mentioned control of switch of each of the first to fifth clutches (10–14) between engagement and disengagement, the rpm of the second sun gear 81 gradually increases, during the period of time from the start time to the first switch rpm ① in the first mode, from zero to the reduced rpm Nir as shown by a narrow dash-single-dot line "Ns2" in FIG. 10, is constant at the reduced rpm Nir in the second mode, gradually increases, during the period of time from the second switch rpm ③ to the third switch rpm ⑤ in the third mode, from the reduced rpm Nir to the input shaft rpm Ni, and is constant at the input shaft rpm Ni in the fourth mode. On the other hand, the rpm of the second ring gear 83 is kept in no rotation during the period of time from the start time to the first switch rpm ① in the first mode as shown by a dash-double-dot line "Nr2" in FIG. 10, gradually increases, during the period of time from the first switch rpm ① to the second switch rpm ③ in the second mode, from zero to the reduced rpm Nir, is kept constant at the reduced rpm Nir in the third mode, and gradually increases, in the fourth mode, from the reduced rpm Nir at two-step rates of speed increase, i.e., a first-step rate during the period of time from the third switch rpm ⑤ to the intermediate rpm ⑥ and a second-step rate during the period of time from the intermediate rpm ⑥ and the maximum rpm ⑦ corresponding to the highest change gear ratio in the fourth mode, to reach the input shaft rpm Ni at the maximum rpm ⑦.

Next, the control of operation of the HST 4 will be described with reference to FIG. 10. Within all the change gear ratio ranges in the first, second and third modes and the change gear ratio range from the minimum change gear ratio position to the middle change gear ratio position (intermediate rpm ⑥ in the fourth mode, the swash plate angle changing means 16 is put into non-operation so that the swash plate 61 of the hydraulic motor 6 is held at the maximum swash plate angle 17 degrees. In the middle change gear ratio position in the fourth mode, the swash plate angle changing means 16 is operated so that the swash plate 61 is changed to a swash plate angle (17 degrees/3) obtained by multiplying the maximum swash plate angle by a ratio identical with the reduction gear ratio of the third planetary gear set 15. Within the change gear ratio range from the middle change gear ratio position to the highest change gear ratio position, the rpm of the motor shaft 62 is increased to rpm obtained by multiplying it by the reciprocal of the reduction gear ratio.

The swash plate angle of the variable swash plate 51 of the hydraulic pump 5 is increasingly or decreasingly controlled by the increase/decrease control means in the controller 18 in the following manner. In the first mode, the variable swash plate 51 is gradually inclined from the neutral position at the start time (swash plate angle of zero degree) toward the higher change gear ratio, and is continuously inclined toward (−) side at a rate of increase or decrease that the maximum inclined angle of −17 degrees comes at the first change gear ratio between the first and second modes, corresponding to the first switch rpm ①.

In the second mode, the variable swash plate 51 is continuously inclined from the swash plate angle (−17 degrees) toward (+) side at the rate of increase or decrease identical in absolute value with that of the high change gear ratio range in the first mode, reaches the neutral position at the middle change gear ratio (intermediate rpm ②) in the second mode, and is further inclined until the swash plate angle reaches +17 degrees at the second change gear ratio between the second and third modes, corresponding to the switch rpm ③.

In the third mode, the variable swash plate 51 is changed in position so as to be inclined toward (−) side at the same rate of increase or decrease as in the second mode at the second change gear ratio, is returned to the neutral position at the middle change gear ratio (intermediate rpm ④) in the third mode, and is further inclined until the swash plate angle reaches −17 degrees at the third change gear ratio between the third and fourth modes, corresponding to the switch rpm ⑤.

In the fourth mode, the variable swash plate 51 is changed in position so as to be inclined toward (+) side at the same rate of increase or decrease as in the third mode at the third change gear ratio, is returned to the neutral position at the middle change gear ratio (intermediate rpm ⑥) in the fourth mode, and is further inclined until the swash plate angle reaches +17 degrees at the rpm ⑦ corresponding to the highest change gear ratio in the fourth mode.

During the period of time from the first mode to the intermediate rpm ⑥ in the fourth mode, the rpm transmitted to the first sun gear 71 through the gears (66, 76) and the connecting shaft 75 by the control of the swash plate angles of the variable swash plate 51 and the swash plate 61 of the HST 4 is changed, as shown by the line "Ns1" in FIG. 10, according to a characteristic like the increase/decrease change characteristic of the variable swash plate 51 so as to be increasingly or decreasingly changed between the reduced rpm +Nir and −Nir. On the other hand, during the period of time from the intermediate rpm ⑥ to the highest change gear ratio in the fourth mode, the rpm is increased at a rate of increase or decrease three times larger than the preceding rate by the increase in speed of the motor shaft 62 due to the change of the swash plate angle of the swash plate 61.

Figure 7:
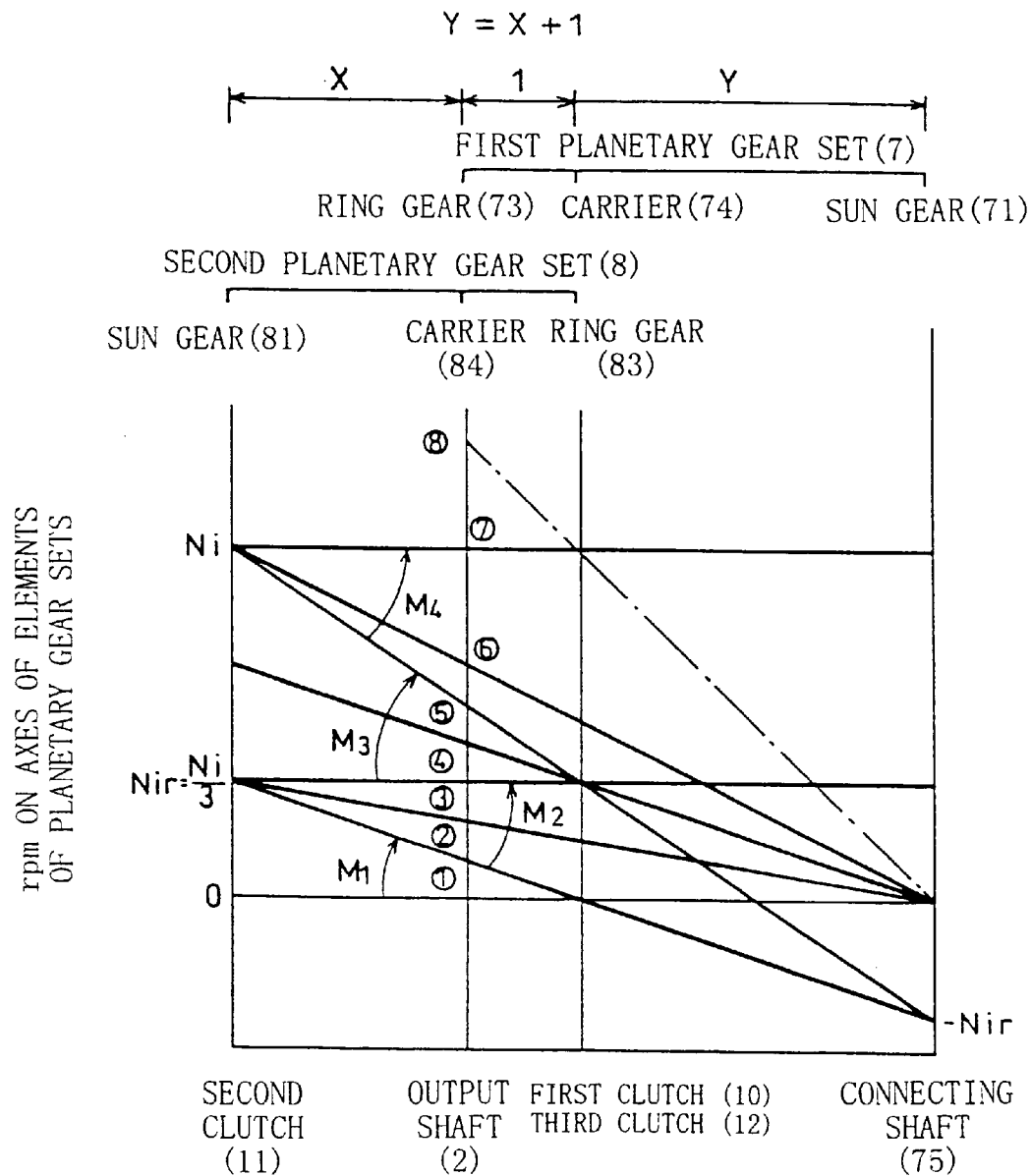
FIG. 7 is a graph of another embodiment of the present invention corresponding to FIG. 3.

Through the above control of switch of each of the first to fifth clutches (10–14) between engagement and disengagement by the controller 18, the above control of increasing and decreasing change of the swash plate angle of the variable swash plate 51 and the above control of change of the swash plate 61, the range of advance-side speed change in the first mode becomes the range shown by the allow M1 in FIG. 7, the range of speed change in the second mode becomes the range shown by the allow M2 in FIG. 7, the range of speed change in the third mode becomes the range shown by the allow M3 in FIG. 7, and the range of speed change in the fourth mode becomes the range shown by the allow M4 in FIG. 7. Further, as shown by the bold dash-dot line in FIG. 10, the rpm of the output shaft 2 is steplessly and continuously changed from the first mode to the intermediate rpm ⑥ in the fourth mode, is increasingly changed at a higher speed increase ratio with the change of the swash plate 61, and reaches the input shaft rpm Ni at the maximum rpm.

Operations of MT and HST in Lockup Operation

In FIG. 10, the lockup operation is controlled, by the lockup operation control means in the controller 18, at the following seven specific rpm, i.e., the switch rpm ①, ③, ⑤ corresponding to the respective change gear ratios at switches between the adjacent modes, the intermediate rpm ②, ④, ⑥ corresponding to the respective middle change gear ratios where the variable swash plate 51 is positioned in the neutral position, and the maximum rpm ⑦ corresponding to the highest change gear ratio in the fourth mode. Below, description will be made about the lockup operation controls and the rotation transmitting conditions in the seven lockup operation points at the specific rpm ① to ⑦ with reference to FIGS. 10 and 15 to 21. The switch from the normal operation to the lockup operation is determined in the case of satisfying the following requirements: the rpm of the engine is any one of the above specific rpm and a variation of the accelerator (change rate of a depressing amount of the accelerator) is a small value within a predetermined range of values or a change rate of the vehicle speed is a small value within a predetermined range of values. When any one of the requirements for the determination of switch to the lockup operation becomes unsatisfied after the switch to the lockup operation, the lockup operation is cancelled and returned to the normal operation.

(Switch rpm ①)

As shown in FIG. 10, the lockup operation at the switch rpm ① is made in a manner of putting both the first clutch 10 and the second clutch 11 into engagement and keeping the fourth clutch 13 into engagement between before and after the switch from the first mode to the second mode and keeping the variable swash plate 51 at a swash plate angle identical with that of the swash plate 61. Thereby, as shown by a path represented by the bold line in FIG. 15, even if rotation is applied from the input shaft 1 to the HST 4, since both the swash plates (51, 61) on the pump 5 side and the motor 6 side have the same swash plate angle, the HST 4 is put into a freewheeling condition not transmitting a rotational force to the MT 3 so that transmission of rotation from the input shaft 1 to the output shaft 2 is made through the MT 3 only. At this time, if both the swash plates (51, 61) have the same swash plate angle, the HST 4 is put into a freewheeling condition. However, for example, if both the swash plates (51, 61) are changed to the neutral position, resistance inside the HST 4 can be minimized, which further increases efficiency. The rotation from the input shaft 1 is applied to the intermediate shaft 9 through the third planetary gear set 15, the fourth clutch 13 and the second clutch 11 so that the second sun gear 81 is rotated at the reduced rpm Nir while the second ring gear 83 is locked into no rotation by the first clutch 10. Thereby, the output shaft 2 is constantly rotated at the rpm ① according to the reduction gear ratio of the first planetary gear set 7.

(Intermediate rpm ②)

The lockup operation at the intermediate rpm ② is made in a manner of keeping the variable swash plate 51 in the neutral position and putting the rotation locking mechanism 17 into operation in a condition that the second clutch 11 and the fourth clutch 13 are put into engagement in the second ode (See FIG. 10). Thereby, as shown by a path represented by the bold line in FIG. 16, even if rotation is applied from the input shaft 1 to the HST 4, only the pump shaft 52 freely rotates and the motor shaft 62 is put into no rotation. Accordingly, transmission of rotation from the input shaft 1 to the output shaft 2 is made through the MT 3 only. Further, rotation from the input shaft 1 is applied to the intermediate shaft 9 through the third planetary gear set 15, the fourth clutch 13 and the second clutch 11, the second sun gear 81 is rotated at the reduced rpm Nir, and the gear 66 is locked by the rotation locking mechanism 17 so that the first sun gear 71 is locked into no rotation. Thereby, the output shaft 2 is constantly rotated at the rpm ② according to the first ring gear 73 and the second planet gear 82.

(Switch rpm ③)

The lockup operation at the switch rpm ③ is made in a manner of putting both the second clutch 11 and the third clutch 12 into engagement and keeping the fourth clutch 13 into engagement between before and after the switch from the second mode to the third mode (See FIG. 10) and keeping the variable swash plate 51 at a swash plate angle identical with that of the swash plate 61. Thereby, as shown by a path represented by the bold line in FIG. 17, even if rotation is applied from the input shaft 1 to the HST 4, the HST 4 is put into a freewheeling condition, so that the rotation from the input shaft 1 is applied, at the reduced rpm Nir through the third planetary gear set 15 and the fourth clutch 13, to the intermediate shaft 9 and the tubular member 77 through the second clutch 11 and the third clutch 12, respectively, and the second sun gear 81 and the second ring gear 83 are rotated at the reduced rpm Nir. Thereby, the output shaft (2) is constantly rotated at the rpm ③ (Nir).

(Intermediate rpm ④)

The lockup operation at the intermediate rpm ④ is made in a manner of keeping the variable swash plate 51 in the neutral position and putting the rotation locking mechanism 17 into operation in a condition that the third clutch 12 and the fourth clutch 13 are put into engagement in the third mode (See FIG. 10). Thereby, as shown by a path represented by the bold line in FIG. 18, even if rotation is applied from the input shaft 1 to the HST 4, only the pump shaft 52 freely rotates. Accordingly, rotation from the input shaft 1 is applied to the tubular member 77 through the third planetary gear set 15, the fourth clutch 13 and the third clutch 12, the first carrier 74 is rotated at the reduced rpm Nir, and the gear 66 is locked by the rotation locking mechanism 17 so that the first sun gear 71 is locked into no rotation. Thereby, the output shaft 2 is constantly rotated at the rpm ④ according to the first ring gear 73.

(Switch rpm ⑤)

The lockup operation at the switch rpm ⑤ is made in a manner of keeping the third clutch 12, the fourth clutch 13 and the fifth clutch 14 into engagement between before and after the switch from the third mode to the fourth mode (See FIG. 10) and keeping the variable swash plate 51 at a swash plate angle identical with that of the swash plate 61. Thereby, as shown by a path represented by the bold line in FIG. 19, even if rotation is applied from the input shaft 1 to the HST 4, the HST 4 is put into a freewheeling condition, so that the rotation from the input shaft 1 is applied at the reduced rpm Nir to the second ring gear 83 through the third planetary gear set 15, the fourth clutch 13, the third clutch 12 and the tubular member 77 and is applied at the input shaft rpm Ni to the second sun gear 81 through the fifth clutch 14 and the intermediate shaft 9. Thereby, the output shaft 2 is constantly rotated at the rpm ⑤.

(Intermediate rpm ⑥)

The lockup operation at the intermediate rpm ⑥ is made in a manner of keeping the variable swash plate 51 in the neutral position and putting the rotation locking mechanism 17 into operation in a condition that the fifth clutch 14 is put into engagement in the fourth mode (See FIG. 10). Thereby, as shown by a path represented by the bold line in FIG. 20, even if rotation is applied from the input shaft 1 to the HST 4, only the pump shaft 52 freely rotates. Accordingly, rotation from the input shaft 1 is applied to the intermediate shaft 9 through the fifth planetary gear set 14, the second sun gear 81 is rotated at the input shaft rpm Ni, and the gear 66 is locked by the rotation locking mechanism 17 so that the first sun gear 71 is locked into no rotation. Thereby, the output shaft 2 is constantly rotated at the intermediate rpm ⑥.

(Maximum rpm ⑦)

The lockup operation at the maximum rpm ⑦ is made in a manner of changing the second clutch 11 and the third clutch 12 into engagement, keeping the fifth clutch 14 in engagement (See FIG. 10) and keeping the variable swash plate angle 51 at the maximum swash plate angle identical with that of the swash plate 61. Thereby, as shown by a path represented by the bold line in FIG. 21, even if rotation is applied from the input shaft 1 to the HST 4, the HST 4 is put into a freewheeling condition. Accordingly, rotation from the input shaft 1 is applied, at the input shaft rpm Ni, to the second sun gear 81 through the fifth planetary gear set 14 and the intermediate shaft 9 and to the second ring gear 83 through the intermediate shaft 9, the second clutch 11, the cylindrical member 112, the third clutch 12 and the tubular member 77. Thereby, the output shaft 2 is constantly rotated at the rpm ⑦. At the time, since the swash plate angle of the swash plate 61 of the HST 4 is changed to ⅓ of the maximum swash plate angle so that the rpm of the motor shaft 62 is increased three times, the rotation of the motor shaft 62 synchronizes with the rotation of the output shaft 2 on the first planetary gear set 7 side. If the cylindrical member 112 is freely rotated by keeping the third clutch 12 in engagement over the fourth mode, the engagement of the second clutch 11 can be readied in this lockup operation.

Figure 22:
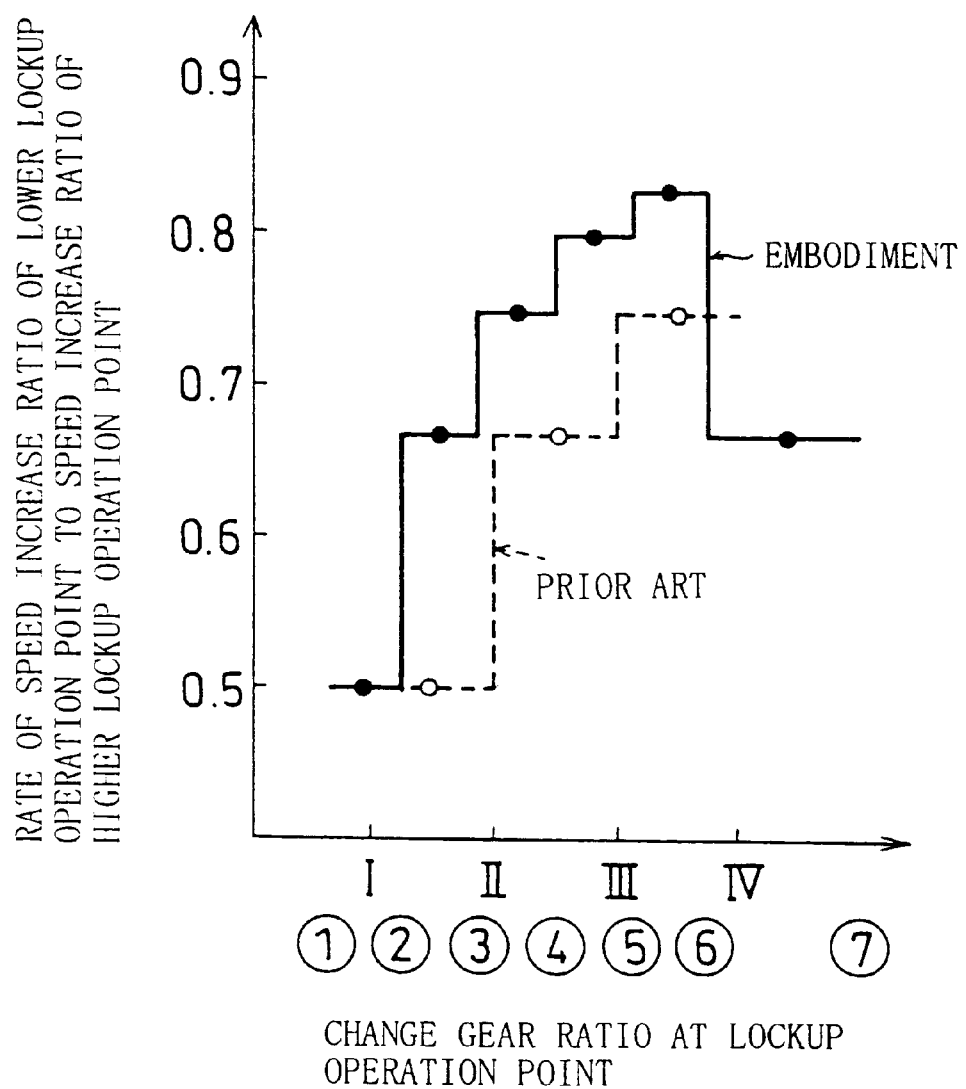
FIG. 22 is a graph showing the relationship between the change gear ratios at the lockup operation points and the rates of speed increase ratios of lower lockup operation points with respect to speed increase ratios of higher lockup operation points.

As mentioned above, in this embodiment, since the number of modes of operation is increased from the conventional three modes to four modes, this increases the number of lockup operation points from conventional four points I–IV to seven points ①–⑦. Further, the increase in density of arrangement of the seven lockup operation points bridges valleys where the efficiency drops between the lockup operations, thereby increasing and leveling efficiency. In terms of this, FIG. 22 shows characteristic comparison between the conventional cases (the cases of lockup operations at the rpm I, II, III and IV) and the cases in the present embodiment (the cases of lockup operations at the rpm ①–⑦) as for a rate of the speed increase ratio at the lower lockup operation point to the speed increase ratio at the higher lockup operation point rate of engine efficiency.

Other Embodiments

The present invention is not limited to the above embodiment and includes a variety of other embodiments. In the above embodiment, the swash plate 61 of the hydraulic motor 6 is controlled such that the swash plate angle is changed from the maximum swash plate angle (17 degrees) to ⅓ thereof in a stroke at the intermediate rpm ⑥. Instead of this, the swash plate angel can be changed gradually during the period of time from the intermediate rpm ⑥ to the highest change gear ratio in the fourth mode so as to reach ⅓ of the maximum swash plate angle at the highest change gear ratio in the fourth mode. This can be realized in a manner that the rate of increase or decrease of the swash plate angle of the variable swash plate 51 is changed according to the degree of change of the swash plate angle.

Further, in order to remove power loss in a no-load operation of the HST 4 of the above embodiment in lockup operation thereby further increasing efficiency, release of charge pressure to the HST 4, reduction in pressing force of each cylinder block (53, 63), bypassing between both the connection pipes (57a, 57b) or the like can be performed.

Furthermore, in the above embodiment, the third planetary gear set 15 as an input rpm reduction mechanism and the pair of clutches (13, 14) as a switching mechanism for switching the third planetary gear set 15 between engagement and disengagement are provided, so that the number of modes of operation is increased to four modes, which increases the number of lockup operation points. However, for example, another selectively-engageable clutch can be additionally provided so that the number of modes of operation is increased to five modes, which further increases the number of lockup operation points. This allows the lockup operation at the rpm shown by ⑧ in FIG. 7 thereby realizing overdrive at a higher change gear ratio than the fourth mode in addition to the increase in the number of lockup operation points.

Industrial Applicability

As mentioned so far, according to the steplessly variable speed transmission of the present invention, the number of modes of operation can be increased from conventional three modes to four or more modes, and the number of lockup operation points can be increased as compared with the conventional case so that the arrangement of the lockup operation points becomes denser, thereby increasing the speed change efficiency without upsizing the transmission. Therefore, the steplessly variable speed transmission of the present invention is useful as a steplessly variable speed transmission used in a manner to be interposed between a drive source (engine) and a driven part (tire and the like) in buses, trucks, various types of constructive machines and various types of industrial machines.

I claim:

1. A steplessly variable speed transmission comprising: an input shaft (1) connected to a drive source; an output shaft (2); a mechanical transmission (3) interposed between the input shaft (1) and the output shaft (2); and a hydrostatic transmission (4) which is disposed in parallel with the input shaft (1) and the output shaft (2), is connected at an input side thereof to the input shaft (1) and is connected at an output side thereof to the output shaft (2) through the mechanical transmission (3), said hydrostatic transmission (4) comprising:
an input-side hydraulic pump (5) for converting rotation applied from the input shaft (1) to a pump shaft (52) into a specified amount of discharge liquid by controlling increase or decrease of the swash plate angle of a variable swash plate (51) between a neutral position at a swash plate angle of zero degrees and an inclined position at a specified swash plate angle in each of plural modes of operation; and
an output-side hydraulic motor (6) for converting a pressure of the discharge liquid from the hydraulic pump (5) into a rotational force by a swash plate (61) set at a specified swash plate angle to rotate a motor shaft (62), said mechanical transmission (3) comprising:
a first planetary gear set (7) including a first sun gear (71) operatively connected to the motor shaft (62) of the hydrostatic transmission (4), a first planet gear (72) engaged with the first sun gear (71) for revolution therearound, and a first ring gear (73) engaged with the first planet gear (72) and operatively connected to the output shaft (2);
a second planetary gear set (8) including a second sun gear (81) operable independently of the first sun gear (71), a second planet gear (82) whose carrier (84) is connected to the first ring gear (73) and which is engaged with the second sun gear (81) for revolution therearound in synchronism with the first ring gear (73), and a second ring gear (83) engaged with the second planet gear (82) and connected to a carrier (74) of the first planet gear (72) for rotation in synchronism with the first planet gear (72);
a first selectively-engageable clutch (10) for disengageably engaging both the first planet gear (72) and the second ring gear (83) with a non-rotation part (103) in accordance with each mode of operation;
a second selectively-engageable clutch (11) for disengageably engaging the second sun gear (81) with the input shaft (1) in accordance with each mode of operation; and
a third selectively-engageable clutch (12) for disengageably engaging both the first planet gear (72) and the second ring gear (83) with the input shaft (1) in accordance with each mode of operation, the mechanical transmission (3) and the hydrostatic transmission (4) being operated in accordance with a change gear ratio so that rotation applied to the input shaft (1) at constant rpm is transmitted to the output shaft (2) at steplessly changed rpm, said steplessly variable speed transmission further comprising:

an input rpm reduction mechanism (15) interposed between the input shaft (1) and the input side of the mechanical transmission (3) to apply rotation of the input shaft (1) to the input side of the mechanical transmission (3) at reduced rpm corresponding to a predetermined reduction gear ratio;

a switching mechanism (13, 14) provided on the input rpm reduction mechanism (15) to control the operation switch of the input rpm reduction mechanism (15) between an operating position of applying rotation of the input shaft (1) to the input side of the mechanical transmission (3) at the reduced rpm in the mode of operation from a low change gear ratio range to an intermediate change gear ratio range and a non-operating position of applying rotation of the input shaft (1) to the input side of the mechanical transmission (3) at a non-reduced speed in the mode of operation in a high change gear ratio range; and lockup operation control means (18) for controlling, when the rpm of the output shaft (2) is at a specified rpm, the hydrostatic transmission (4) to put the motor shaft (62) into a freewheeling condition thereby changing into a condition that power is not transmitted from the hydrostatic transmission (4) to the output shaft (2).

2. The steplessly variable speed transmission of claim 1, wherein the input rpm reduction mechanism is formed of a third planetary gear set (15) including: a third sun gear (151) operatively connected to the input shaft (1); a third planet gear (152) engaged with the third sun gear (151) for revolution therearound; and a third ring gear (153) engaged with the third planet gear (152) and non-rotatably fixed, and the switching mechanism consist of a fourth selectively-engageable clutch (13) for disengageably connecting the third planet gear (152) to both the second clutch (11) and the third clutch (12) therethrough and a fifth selectively-engageable clutch (14) for disengageably connecting the third sun gear (151) to the second sun gear (81) therethrough.

3. The steplessly variable speed transmission of claim 2, wherein the mechanical transmission (3) has four modes of operation according to the change gear ratio composed of a first mode of operation for putting only both the first clutch (10) and the fourth clutch (13) into engagement during a period from a start to the low change gear ratio range, a second mode of operation for putting only both the second clutch (11) and the fourth clutch (13) into engagement in a lower intermediate change gear ratio range, a third mode of operation for putting only both the third clutch (12) and the fourth clutch (13) into engagement in a higher intermediate change gear ratio range, and a fourth mode of operation for putting only the fifth clutch (14) into engagement in the high change gear ratio range.

4. The steplessly variable speed transmission of claim 3, wherein increase/decrease control means (18) is provided for controlling increase and decrease of the swash plate angle of the variable swash plate (51) of the hydraulic pump (5), the increase/decrease control means (18) is arranged to change the swash plate angle of the variable swash plate (51) at rates of increase and decrease that the variable swash plate (51) is in the neutral position at the start time in the first mode, is positioned at a specified reverse-side maximum swash plate angle at a first change gear ratio in switching the mode of operation from the first mode to the second mode, returns to the neutral position at an approximately middle change gear ratio in the change gear ratio range of the second mode, is in a normal-side maximum swash plate angle at a second change gear ratio in switching the mode of operation from the second mode to the third mode, returns to the neutral position at an approximately middle change gear ratio in the change gear ratio range of the third mode, is positioned at the reverse-side maximum swash plate angle at a third change gear ratio in switching the mode of operation from the third mode to the fourth mode, returns to the neutral position at an approximately middle change gear ratio in the change gear ratio range of the fourth mode and is positioned at the normal-side maximum swash plate angle at a highest change gear ratio in the change gear ratio range of the fourth mode, and the lockup operation control means (18) is arranged to operate a freewheeling operation mechanism at the time of respective specified rpm which are rpm of the output shaft (2) corresponding to the first to third change gear ratios, the middle change gear ratios and the highest change gear ratio of the fourth mode.

5. The steplessly variable speed transmission of claim 4, wherein the lockup operation control means (18) is arranged to keep the variable swash plate (51) of the hydraulic pump (5) in a position located at a maximum swash plate angle identical with that of the swash plate (61) of the hydraulic motor (6) at the first to third change gear ratios and the highest change gear ratio of the fourth mode while keeping the variable swash plate (51) in the neutral position of a swash plate angle of zero degree at the middle change gear ratios.

6. The steplessly variable speed transmission of claim 4, wherein the lockup operation control means (18) is arranged to put the first, second and fourth clutches (10, 11, 13) into engagement at the rpm corresponding to the first change gear ratio, put the second, third and fourth clutches (11, 12, 13) into engagement at the rpm corresponding to the second change gear ratio, put the third, fourth and fifth clutches (12, 13, 14) into engagement at the rpm corresponding to the third change gear ratio and put the second, third and fifth clutches (11, 12, 14) into engagement at the rpm corresponding to the highest value in the change gear ratio range of the fourth mode.

7. The steplessly variable speed transmission of claim 6, further comprising a rotation locking mechanism (17) for locking the motor shaft (62) at an output side of the hydraulic motor (6) when the variable swash plate (51) is set in the neutral position, in a manner to receive torque generated on the motor shaft (62).

8. The steplessly variable speed transmission of claim 4, wherein the number of teeth of the third planetary gear set (15) is set such that the reduction gear ratio of the third planet gear (152) to the third sun gear (151) takes a value represented in the following formula $Y/(2X+Y+2)$ wherein Y is a gear ratio between the first sun gear (71) and the first ring gear (73) and X is a gear ratio between the second sun gear (81) and the second ring gear (83).

9. The steplessly variable speed transmission of claim 8, further comprising a swash plate angle changing means (16) for changing the swash plate angle of the swash plate (61) of the hydraulic motor (6), said swash plate angle changing means (16) keeping the swash plate (61) at the maximum swash plate angle in each of the first, second and third modes while changing the swash plate (61) to a smaller swash plate angle close to the neutral position in accordance with the reduction gear ratio of the third planetary gear set (15) on a higher change gear ratio side than the neutral position of the hydraulic pump (5) in the fourth mode.

10. The steplessly variable speed transmission of claim 9, wherein as the reduction gear ratio of the third planetary gear set (15), a value of approximately ⅓ is set.

11. The steplessly variable speed transmission of claim 9, wherein the number of teeth of gears (66, 76) for connecting the motor shaft (62) of the hydraulic motor (6) with the first sun gear (71) is set based on the relationship between the rpm of the output shaft (2) through the fifth clutch (14) in the fourth mode and the maximum allowable rpm of the motor shaft (62) corresponding to the swash plate angle changed by the swash plate angle changing means (16) in the fourth mode.

12. The steplessly variable speed transmission of claim 11, wherein the gear ratios of the gears (66, 76) and the swash plate angle of the swash plate (61) of the hydraulic motor (6) are set in a condition that the rpm of the output shaft (2) does not exceed the rpm of the input shaft (1).

* * * * *